(12) United States Patent
Allen

(10) Patent No.: US 11,516,327 B2
(45) Date of Patent: Nov. 29, 2022

(54) TRAY TOWER WITH POSITION INDEXING TRAYS

(71) Applicant: CommScope Technologies LLC, Hickory, NC (US)

(72) Inventor: Barry Wayne Allen, Siler City, NC (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 17/051,710

(22) PCT Filed: Apr. 26, 2019

(86) PCT No.: PCT/US2019/029303
§ 371 (c)(1),
(2) Date: Oct. 29, 2020

(87) PCT Pub. No.: WO2019/212887
PCT Pub. Date: Nov. 7, 2019

(65) Prior Publication Data
US 2021/0126996 A1    Apr. 29, 2021

Related U.S. Application Data

(60) Provisional application No. 62/665,275, filed on May 1, 2018.

(51) Int. Cl.
*H04M 1/04* (2006.01)

(52) U.S. Cl.
CPC .................. *H04M 1/04* (2013.01)

(58) Field of Classification Search
CPC ............ H04M 1/04; H04Q 1/02; H05K 7/186
See application file for complete search history.

(56) References Cited

U.S. PATENT DOCUMENTS

| 4,161,017 A | 7/1979 | Pierce et al. |
| 4,911,521 A | 3/1990 | Ryuto et al. |
| 5,074,635 A | 12/1991 | Justice et al. |

(Continued)

FOREIGN PATENT DOCUMENTS

| CN | 202383330 U | 8/2012 |
| DE | 10 2019 121 479 A1 | 2/2021 |

(Continued)

OTHER PUBLICATIONS

International Search Report and Written Opinion of the International Searching Authority for International Patent Application No. PCT/US2019/029303 dated Aug. 9, 2019, 11 pages.

(Continued)

*Primary Examiner* — Tuan D Nguyen
(74) *Attorney, Agent, or Firm* — Merchant & Gould P.C.

(57) ABSTRACT

A telecommunications tray is presented herein. In some examples, the telecommunications tray assembly includes a tower structure and at least one hinged tray rotatably mounted to the tower structure. In one aspect, the hinged tray is rotatable between at least two indexed positions, wherein the hinged tray is positively retained in the at least two indexed positions by a position retention structure. In some examples, the position retention structure is a transversely mounted leaf spring that is received into recesses of the tower structure.

19 Claims, 30 Drawing Sheets

(56) References Cited

U.S. PATENT DOCUMENTS

| | | | |
|---|---|---|---|
| 5,613,029 | A | 3/1997 | Burek et al. |
| 5,835,657 | A | 11/1998 | Suarez et al. |
| 6,009,224 | A | 12/1999 | Allen |
| 6,157,715 | A | 12/2000 | Daoud |
| 6,192,180 | B1 | 2/2001 | Kim et al. |
| 6,418,266 | B1 | 7/2002 | Vitantonio |
| 6,449,418 | B1 | 9/2002 | Brocheton |
| 8,086,084 | B2 | 12/2011 | Bran de Leon et al. |
| 8,111,966 | B2 | 2/2012 | Holmberg et al. |
| 8,428,665 | B1 * | 4/2013 | McLaughlin ........... H04M 1/04 455/90.3 |
| 8,554,044 | B2 | 10/2013 | Bran de Leon et al. |
| 9,063,316 | B2 | 6/2015 | Loeffelholz et al. |
| 9,523,834 | B2 | 12/2016 | Kowalczyk et al. |
| 9,575,279 | B1 | 2/2017 | Yoshizawa et al. |
| 2006/0147173 | A1 | 7/2006 | Womack et al. |
| 2008/0310811 | A1 | 12/2008 | Gonzales et al. |
| 2011/0097051 | A1 | 4/2011 | Vermeulen et al. |
| 2011/0299823 | A1 | 12/2011 | Bran de Leon et al. |
| 2012/0224305 | A1 | 9/2012 | Yoo |
| 2013/0243386 | A1 | 9/2013 | Pimentel et al. |
| 2014/0321825 | A1 | 10/2014 | Claessens et al. |
| 2017/0227728 | A1 | 8/2017 | Claessens et al. |
| 2017/0363831 | A1 | 12/2017 | Cornelissen et al. |
| 2022/0007089 | A1 | 1/2022 | Claessens et al. |
| 2022/0187556 | A1 | 6/2022 | Claessens et al. |

FOREIGN PATENT DOCUMENTS

| | | |
|---|---|---|
| DE | 10 2019 121 480 A1 | 2/2021 |
| DE | 10 2019 121 427 B4 | 3/2021 |
| FR | 2 898 417 B1 | 9/2008 |
| KR | 20-0380996 Y1 | 4/2005 |
| WO | 94/12904 A2 | 6/1994 |
| WO | 02/097488 A2 | 12/2002 |
| WO | 2009/089327 A2 | 7/2009 |
| WO | 2009/131895 A2 | 10/2009 |
| WO | 2012/019936 A1 | 2/2012 |
| WO | 2012/110452 A1 | 8/2012 |
| WO | 2013/149846 A1 | 10/2013 |
| WO | 2016/042032 A1 | 3/2016 |
| WO | 2019/160995 A1 | 8/2019 |
| WO | 2019/209643 A1 | 10/2019 |
| WO | 2020/198155 A1 | 10/2020 |
| WO | 2020/205554 A1 | 10/2020 |
| WO | 2020/205569 A1 | 10/2020 |
| WO | 2020/205572 A1 | 10/2020 |
| WO | 2021/011541 A1 | 1/2021 |

OTHER PUBLICATIONS

International Search Report and Written Opinion of the International Searching Authority for International Patent Application No. PCT/US2020/013745 dated May 8, 2020, 10 pages.

International Search Report and Written Opinion of the International Searching Authority for International Patent Application No. PCT/US2020/025352 dated Jul. 23, 2020, 11 pages.

International Search Report and Written Opinion of the International Searching Authority for International Patent Application No. PCT/US2020/025363 dated Jul. 28, 2020, 12 pages.

International Search Report and Written Opinion of the International Searching Authority for International Patent Application No. PCT/US2020/041940 dated Nov. 5, 2020, 12 pages.

* cited by examiner

FIG. 49
FIG. 50
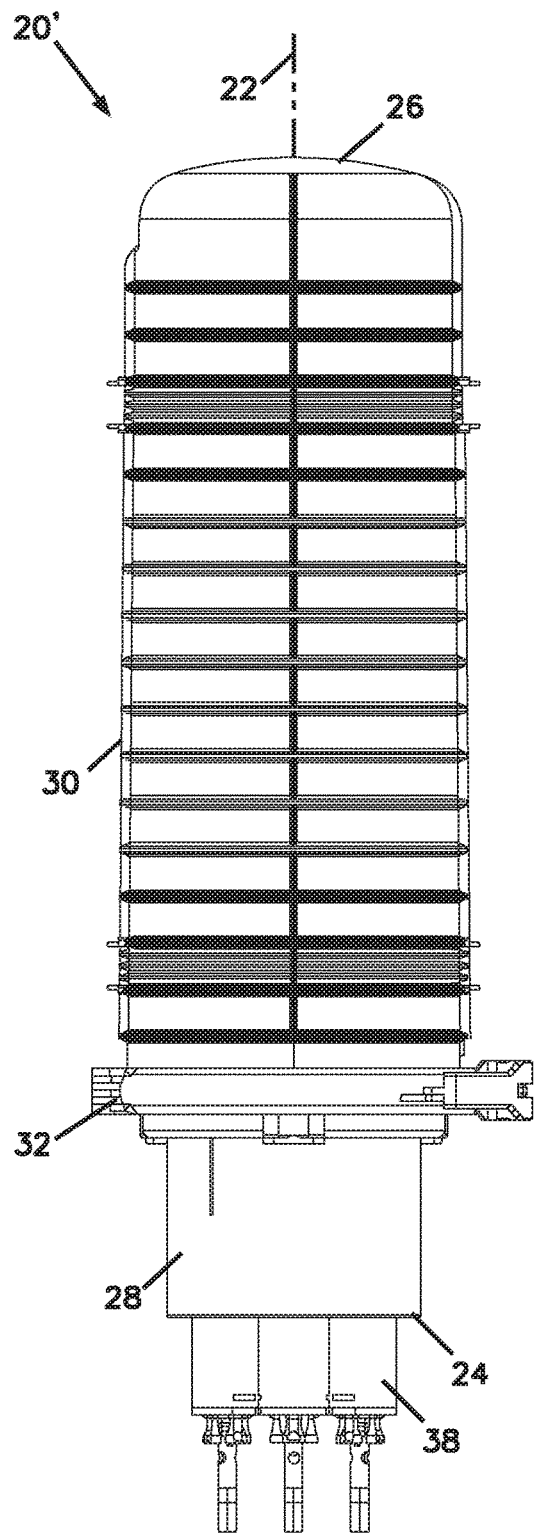
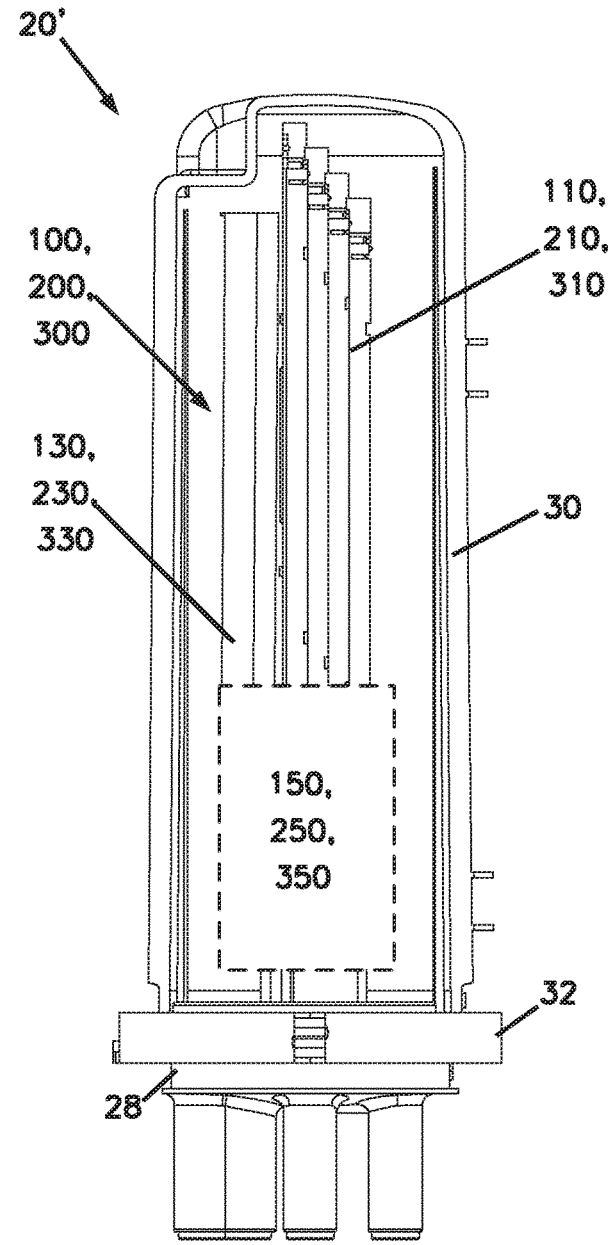

TRAY TOWER WITH POSITION INDEXING TRAYS

CROSS-REFERENCE TO RELATED APPLICATION

This application is a National Stage Application of PCT/US2019/029303, filed on Apr. 26, 2019, which claims the benefit of U.S. patent application Ser. No. 62/665,275, filed on May 1, 2018, the disclosures of which are incorporated herein by reference in their entireties. To the extent appropriate, a claim of priority is made to each of the above disclosed applications.

BACKGROUND

To increase storage density, some telecommunications equipment resides in stacked and hinged trays. In order to gain access to one of the hinged trays, the trays above that tray must be rotated up and held in this position. In some prior art designs, a separate member, sometimes referred to as a "kickstand" is provided on each tray that can be rotated to hold the tray and all above trays in the upward position. Necessarily, the kickstand must be designed to hold the weight of multiple trays. Improvements are desired.

SUMMARY

In one aspect of the disclosure, a telecommunications system is disclosed.

In some examples, a telecommunications tray assembly is disclosed including a tower structure and at least one hinged tray rotatably mounted to the tower structure, the hinged tray being rotatable between at least two indexed positions, wherein the hinged tray is positively retained in the at least two indexed positions by a position retention structure.

In some examples, the at least one hinged tray includes a plurality of hinged trays.

In some examples, the position retention structure includes a spring member.

In some examples, the tower structure includes a first recess and a second recess and wherein the spring member is positioned within the first recess when the tray is in one of the at least two indexed positions and is positioned within the second recess when the tray is in the other of the at least two indexed positions.

In some examples, the spring member is integrally formed with the hinged tray.

In some examples, the hinged tray is a unitarily formed component.

In some examples, the spring member is supported by a pair of deflectable support arms.

In some examples, the hinged tray includes a pair of hinge arms engaged with the tower structure.

In some examples, a telecommunications tray is disclosed including a main body an end wall and a perimeter sidewall defining an interior region for the storage of telecommunications components, a first hinge arm and a second hinge arm extending away from the main body, the first and second hinge arms each including a projection for rotatably mounting the tray to a tower structure, and a position retention structure including a spring member, the spring member being spaced from the first and second hinge arms.

In some examples, the position retention structure includes a first hinge arm, a second hinge arm, and a spring member extending between the first and second hinge arms.

In some examples, the first and second hinge arms are deflectable.

In some examples, the position retention structure includes at least one cantilevered spring member.

In some examples, the telecommunications tray is unitarily formed as a single component.

In some examples, the projections of the first and second hinge arms extend inwardly towards each other.

In some examples, a telecommunications tray assembly is disclosed that includes a tower structure and a plurality of stacked hinged trays rotatably mounted to the tower structure, wherein the hinged trays being rotatable between at least two indexed positions, wherein the hinged trays are positively retained in the at least two indexed positions by a position retention structure.

In some examples, the position retention structure of each of the plurality of hinged trays includes a spring member.

In some examples, the spring member of each tray is integrally formed with the hinged tray.

In some examples, each hinged tray is a unitarily formed component.

In some examples, all of the plurality of hinged trays can be rotated simultaneously between the at least two indexed positions.

In some examples, the position retention structure of each of the plurality of hinged trays holds the entire weight of the hinged tray when the hinged tray is in at least one of the two indexed positions.

In some examples, a telecommunications tray includes a main body defining a telecommunications component storage area, a connection structure configured for rotatably connecting the main body to a tower or base structure, and a position retention structure including a spring member, the spring member being spaced from the connector.

In some examples, the connection structure and the position retention structure are integrally formed with the main body.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 49 is a front view of an enclosure within which the tray assemblies of the disclosure can be installed.

FIG. 50 is a cross-sectional side view of the enclosure shown in FIG. 46 housing a tray assembly in accordance with the disclosure.

DETAILED DESCRIPTION

Figure 1:
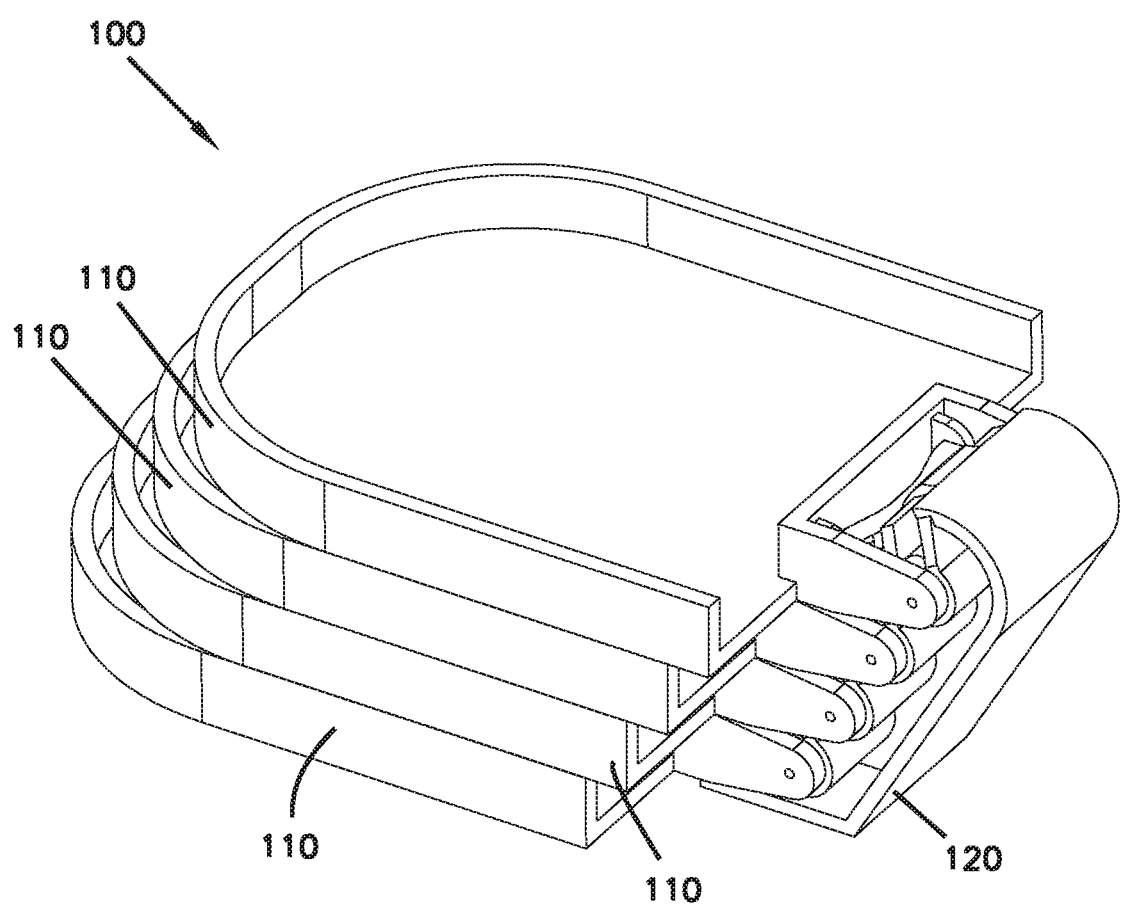
FIG. 1 is a perspective view of a telecommunications tray assembly in accordance with principles presented herein.
Figure 2:
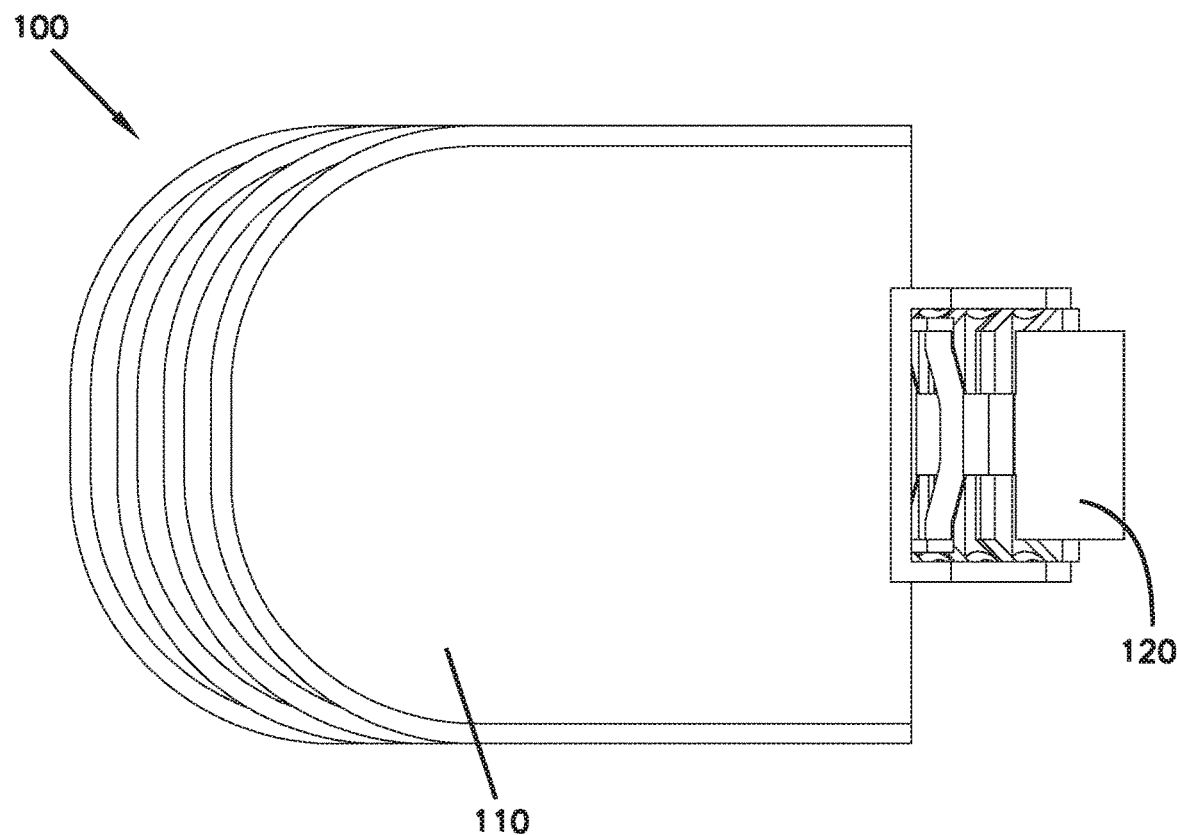
FIG. 2 is a top view of the telecommunications tray shown in FIG. 1.
Figure 3:
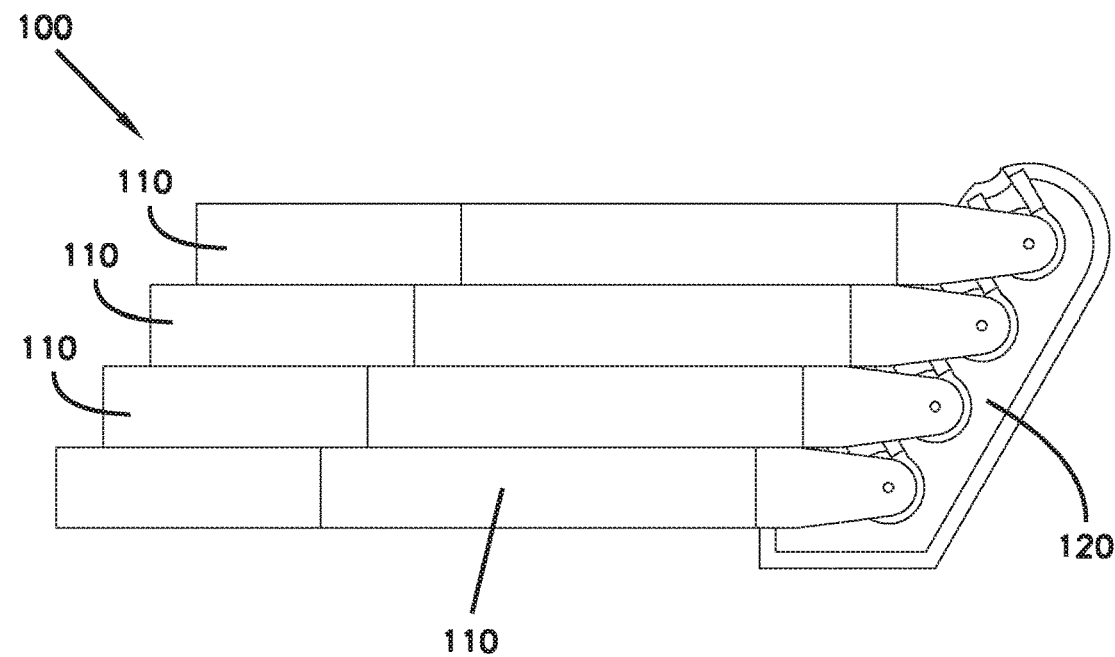
FIG. 3 is a side view of the telecommunications tray shown in FIG. 1.

Reference will now be made in detail to exemplary aspects of the present disclosure that are illustrated in the accompanying drawings. Wherever possible, the same reference numbers will be used throughout the drawings to refer to the same or like parts. Additionally, any examples set forth in this specification are not intended to be limiting and merely set forth some of the many possible embodiments for the appended claims.

Enclosures

FIGS. 49 and 50 show an enclosure 20 for housing the disclosed tray assemblies 100, 200, 300. In one aspect, the enclosure 20 defines a central longitudinal axis 22 that extends along a length of the enclosure 20 from a bottom end 24 to a top end 26. A base 28 defines the bottom end 24 of the enclosure 20 while a dome 30 defines the top end 26 of the enclosure 20. The base 28 and the dome 30 are interconnected by a clamp 32 that mounts over flanges respectively defined by the base 28 and the dome 30. A seal can mount between the flanges to provide an environmental seal that prevents moisture, dust and, pests from entering the interior of the enclosure 20. Although a pedestal type enclosure 20 is shown, enclosure 20 may also be configured for aerial, buried, or underground applications. A plurality of primary cable through-ports extend through the base 28 for allowing cables 40 (e.g., trunk cables, drop cables, or other cables) to enter the enclosure 20. To accommodate drop cables or other smaller cables (i.e., secondary cables), secondary cable tube assemblies 38 are mounted in some of the primary cable through-ports. The remainder of the primary cable through-ports 36 can receive plugs used to seal the unoccupied primary cable through-ports. Referring to FIG. 50, the interior of the enclosure 20 can be seen.

Within the enclosure, a tray assembly 100 is housed. As is discussed in the next section, the tray assembly 100 includes a plurality of hinged trays 110 supported by a tower structure 120, which is in turn supported by a base structure. The hinged trays 110 are individually rotatable with respect to the base structure 120 and enclosure 20 to allow for access to any splice without disturbing fibers in other hinged trays 110. In one aspect, the trays house and support fiber-optic cables and ensure that fiber-optic cables can be spliced and housed, quickly and easily. Additionally, the hinged trays 110 support fast, mass splicing jobs in feeder and long-haul areas of the network. The hinged splice hinged trays 110 are compatible with many common cable types.

Tray Assemblies

It is noted that the following description utilizes directional language (e.g. raised, lowered, upper, lower, horizontal, vertical, etc.) that indicates a particular orientation. Although the disclosed tray assemblies 100 can be oriented as shown in the drawings, many other orientations are possible, and the directional language used herein should not be taken to limit the disclosure.

Referring to FIGS. 1-25, a first example of a tray assembly 100 is presented. As shown, the tray assembly 100 includes a plurality of trays 110 rotatably connected to and supported by a tower structure 120. In some examples, each of the trays 110 is unitarily formed as a single component. Due to the design of the features of the tray 110, and in particular the design of the position retention structure 116 (described below), the tray 110 can be molded as a unitarily formed component without requiring any undercuts. In some examples, the tower structure 120 is unitarily formed as a single component. In some examples, the trays 110 and/or tower structure 120 are formed from a polymeric material, such as an ABS polycarbonate material.

As shown, each of the trays 110 defines a tray portion 112 and a hinge portion 114 connected to the tray portion 112. The tray portion 112 is shown as defining an end wall 112a from which a perimeter sidewall 112b extends. Together, the end wall 112a and sidewall 112b define an interior storage space 112c for housing telecommunications cables and other related components. Although the end wall 112b is shown without any further features, additional projections and structures can be provided to facilitate the retention of telecommunications cables and other related components.

The hinge portion 114 is shown as including a pair of oppositely positioned, spaced apart hinge arms 114a, 114b supported by a sidewall 114c to form a generally u-shaped structure. In one aspect, the sidewall 114c extends from the end wall 112a of the tray portion 112. Each of the hinge arms 114a, 114b is shown as being provided with an inwardly extending projection 114d which is received by corresponding apertures 124 in the tower structure 120. As is explained in more detail later, the hinge arms 114a, 114b are provided with sufficient flexibility to allow for the hinge arms 114a, 114b to be deflected away from the tower structure 120 such that the inwardly extending projections 114d can be aligned with the apertures 124 during installation and removal of the tray 110 from the tower 120.

Each tray 110 is also shown as being provided with a position retention structure 116 including a pair of support arms 116a, 116b that support a leaf spring member 116c. In one aspect, the support arms 116a, 116b extend from the sidewall 114c in a direction towards the projections 114d. In one aspect, the support arms 116a, 116b extend in a direction that is parallel to the length of the hinge arms 114a, 114b and are spaced away from the hinge arms 114a, 114b in an inward direction such that the support arms 116a, 116b reside between the hinge arms 114a, 114b. The support arms 116a, 116b are provided with some elasticity such that forces exerted onto the leaf spring member 116c result in deflection of the support arms 116a, 116b. As the support arms 116a, 116b are spaced away from the hinge arms 114a, 114b, the forces transmitted to the support arms 116a, 116b from the leaf spring member 116c are not transmitted to the hinge arms 114a, 114b. As is discussed later, the leaf spring member 116c functions as a positioning member that enables the tray 110 to be positively retained or indexed into either a raised or first or lowered position. By the use of the term positively retained or positively indexed, it is meant to describe a position in which an external force must be applied to rotate the tray 110 out of the indexed or retained position.

As presented, the tower structure 120 is formed as a main body 122 defining a plurality of apertures 124 for receiving the projections 114d of each tray 110. In the example shown, four apertures 124 for holding four trays 110 are shown. However, more or fewer apertures 124 can be provided. In one aspect, the apertures 124 are defined by a sidewall 124a having a chamfered or scalloped portion 124b and a ramped portion 124c to allow for easier insertion of the projections 114d into the apertures 124. The tower structure is also provided with a plurality of recesses 126 separated by slightly rounded bridge members 128. In one aspect, the apertures 124, recesses 126, and bridge members 128 are aligned at an angle α1. The angle α1 results in these features being offset from each other at a distance P2 such that the adjacently above corresponding features are recessed horizontally (as shown on the page at FIG. 18) with respect to the lower features by this same offset. This construction allows the hinged trays 110 to be slightly offset from each other in the lengthwise direction (i.e. upper tray 110 is offset towards the tower structure 120 relative to the lower tray 110, as most easily seen at FIG. 1). In the example shown, angle α1 is about 45 degrees. This offset provides for sufficient clearance such that each tray 110 can be fully rotated into the third or raised position regardless of the position of the tray. The apertures 124 are vertically spaced at a distance P1, the recesses 126 have a radius R1, and the bridge portions 128 have a radius R2. Although the recesses 126 and bridge portions 128 are shown as being generally circular in shape, these features can be provided with other non-symmetrical arcuate shapes such that the force required to rotate the tray 110 from one indexed position to another is greater or lesser than the force required to rotate the tray 110 in the opposite direction.

Figure 5:
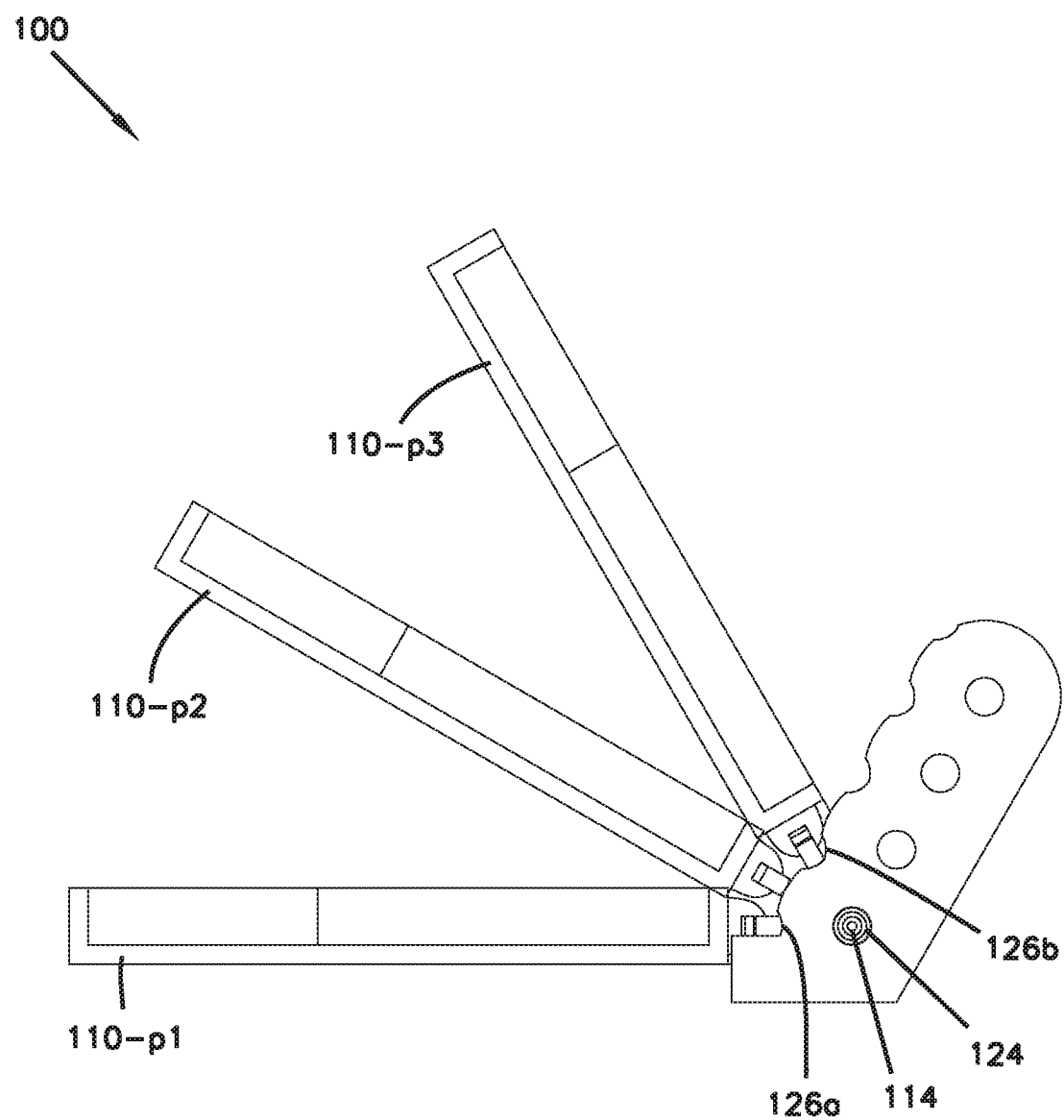
FIG. 5 is a side cross-sectional schematic view of the telecommunications tray assembly shown in FIG. 4, with the tray shown in multiple possible positions.
Figure 6:
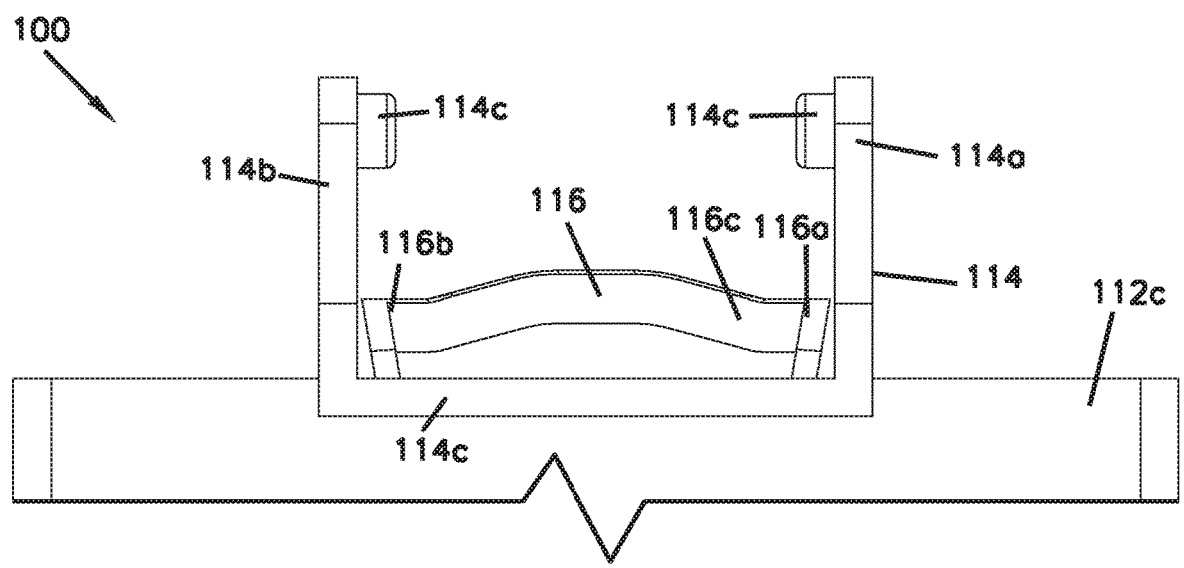
FIG. 6 is a partial top view of the tray shown in FIG. 5, when the tray is in a second or intermediate position.
Figure 7:
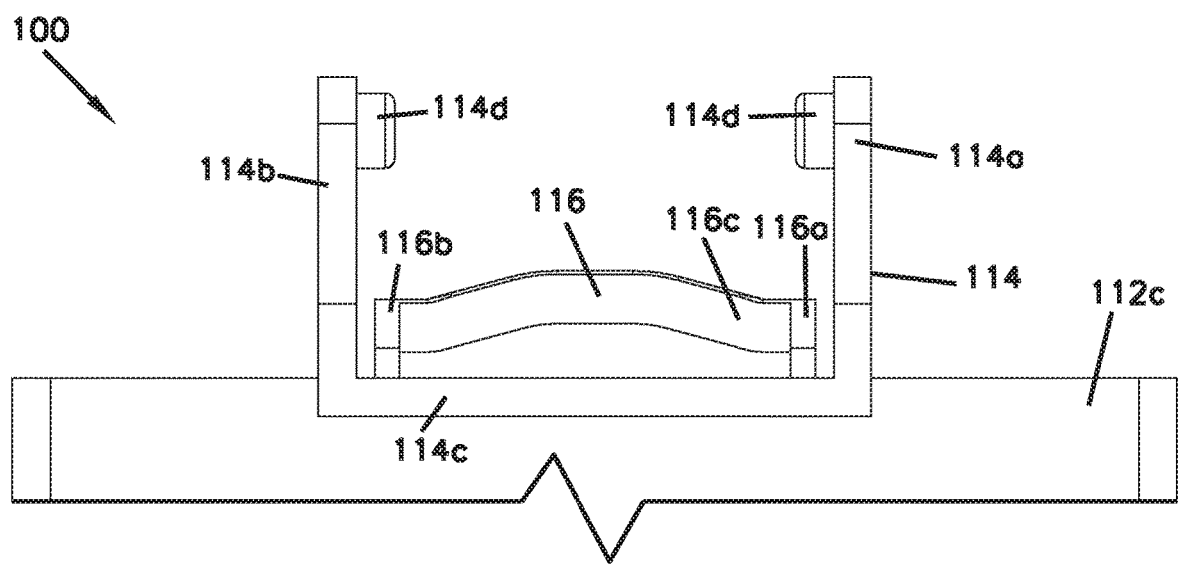
FIG. 7 is a partial top view of the tray shown in FIG. 5, when the tray is in a lowered or third or raised position.
Figure 8:
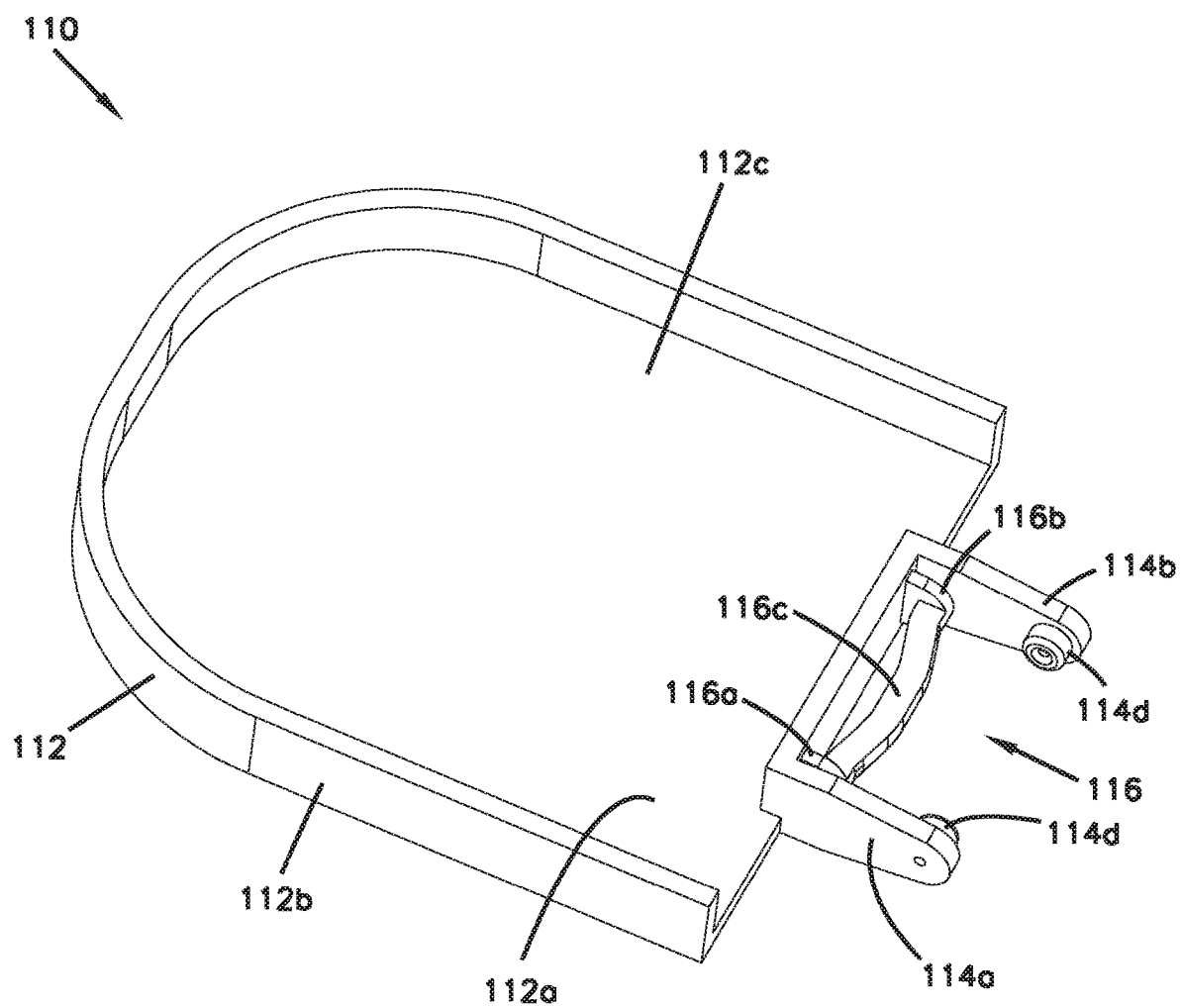
FIG. 8 is a perspective view of one of the trays shown in FIGS. 1 and 5.
Figure 9:
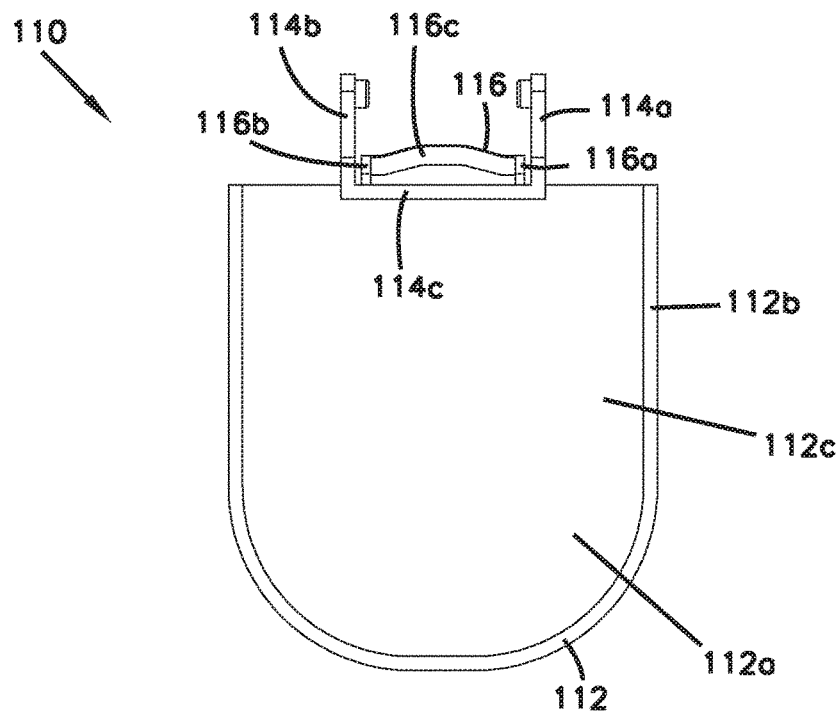
FIG. 9 is a top view of the tray shown in FIG. 8.
Figure 10:
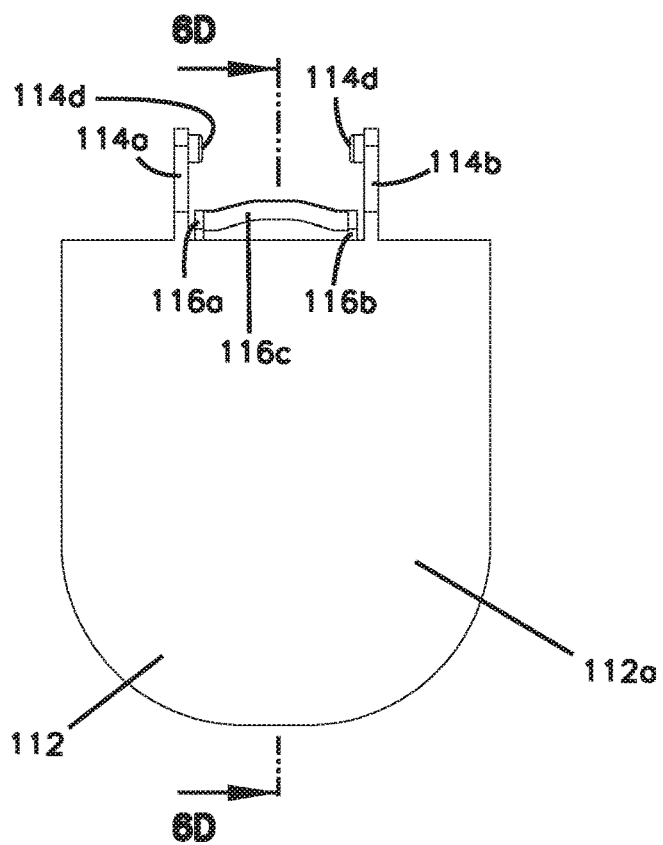
FIG. 10 is a bottom view of the tray shown in FIG. 8.
Figure 11:
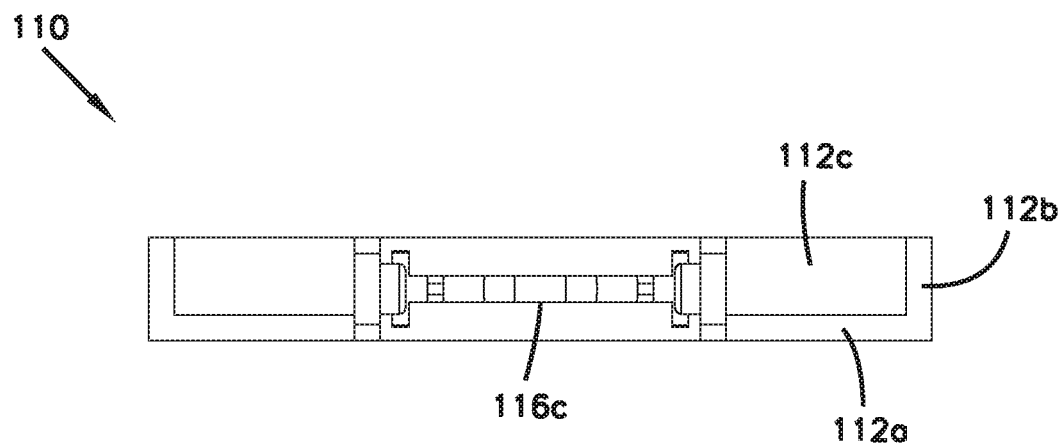
FIG. 11 is an end view of the tray shown in FIG. 8.
Figure 12:
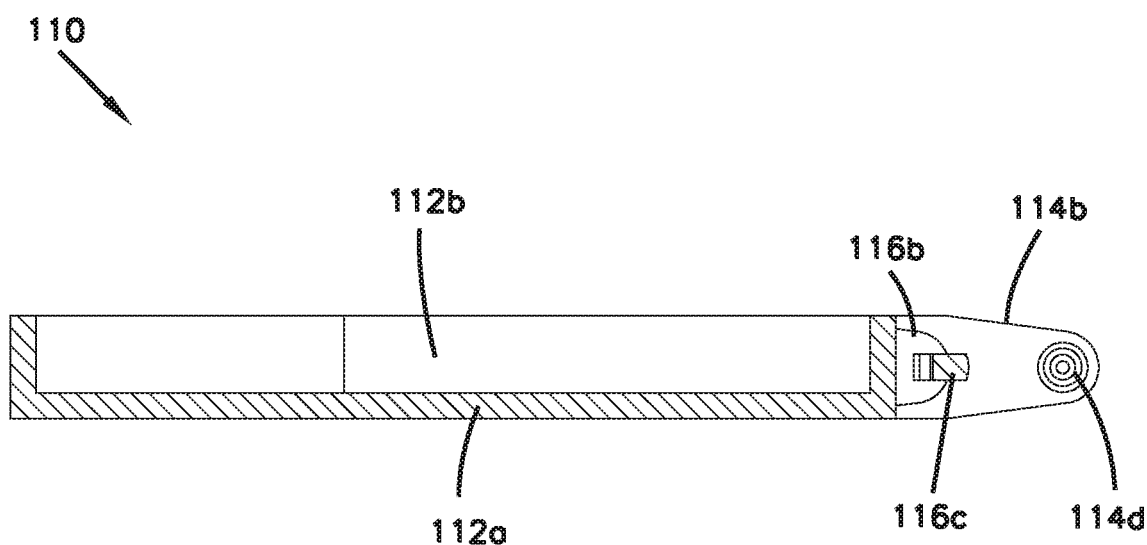
FIG. 12 is a longitudinal cross-sectional view of the tray shown in FIG. 8.
Figure 13:
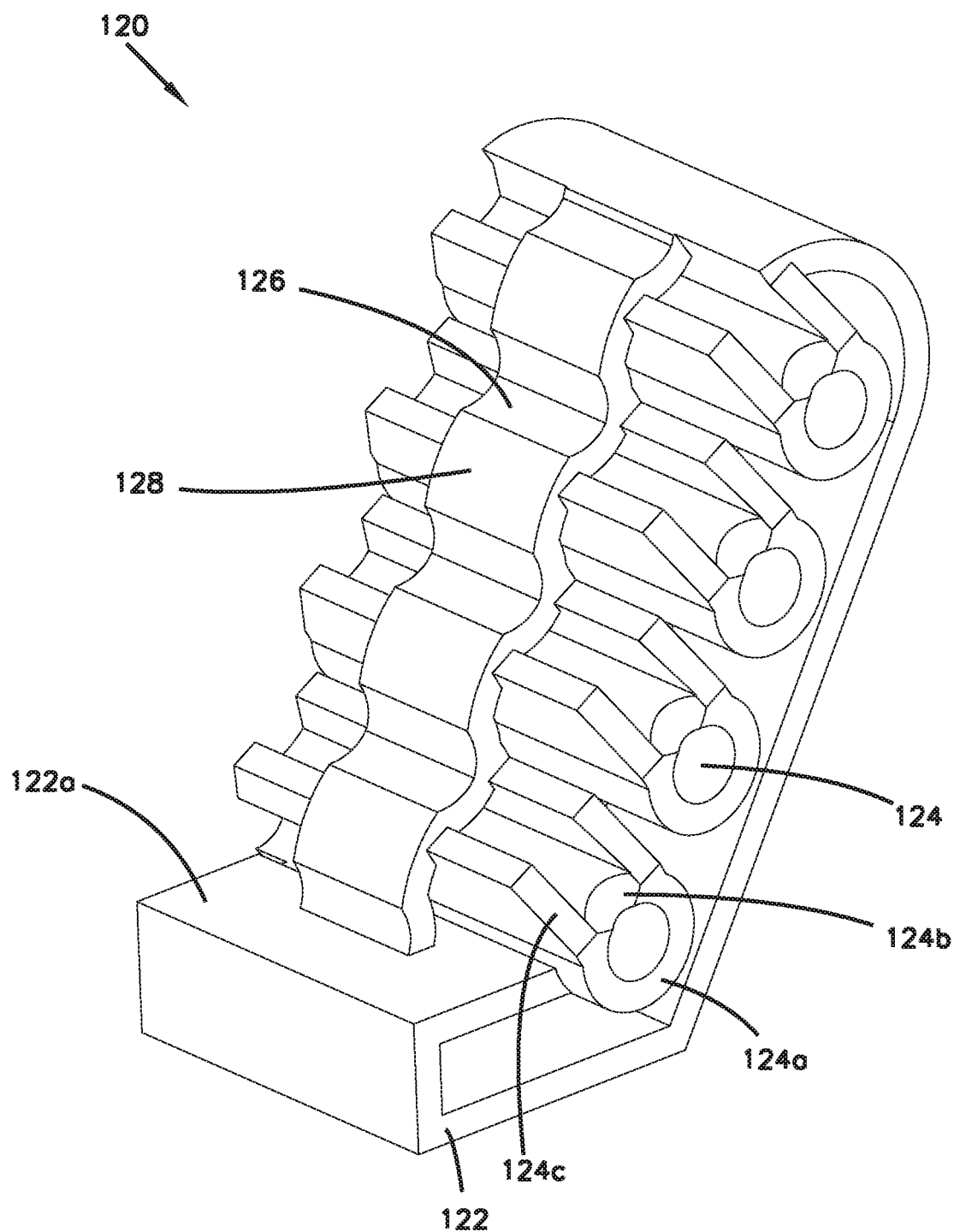
FIG. 13 is a perspective view of a tower structure of the tray assembly shown in FIG. 1.
Figure 14:
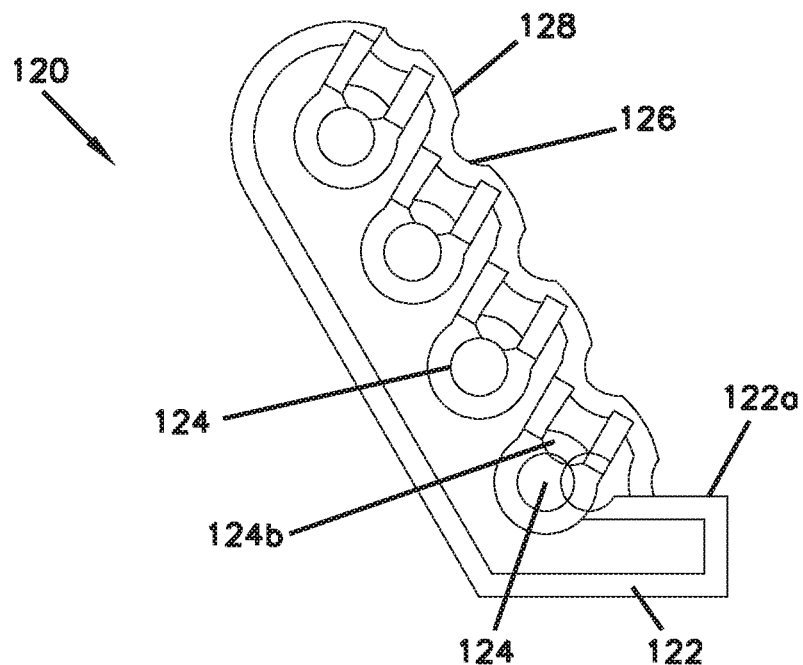
FIG. 14 is a first side view of the tower structure shown in FIG. 13.
Figure 15:
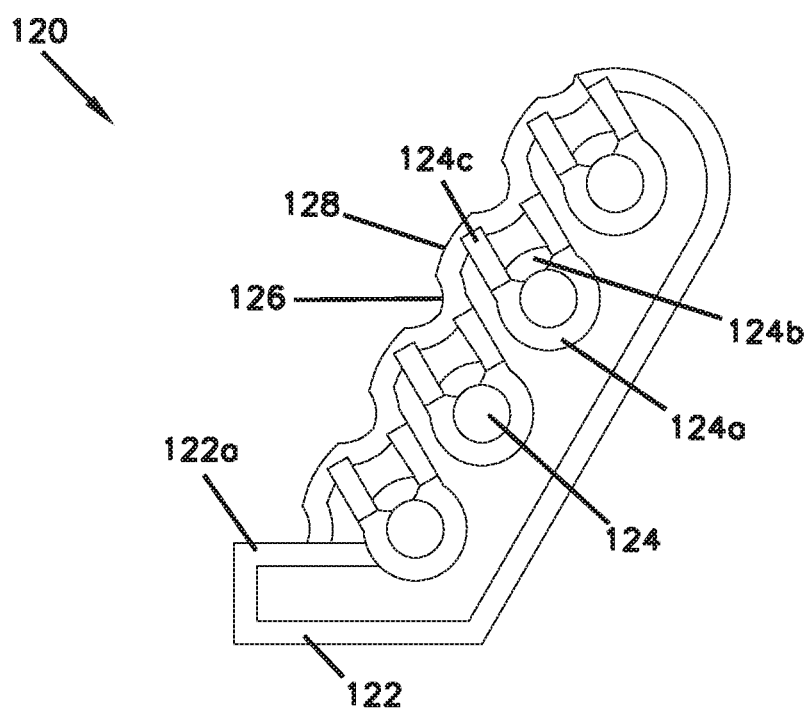
FIG. 15 is a second side view of the tower structure shown in FIG. 13.
Figure 16:
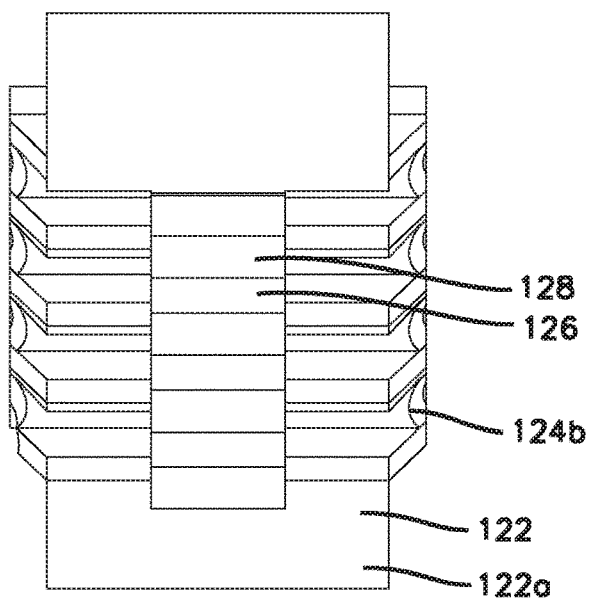
FIG. 16 is a top view of the tower structure shown in FIG. 13.
Figure 17:
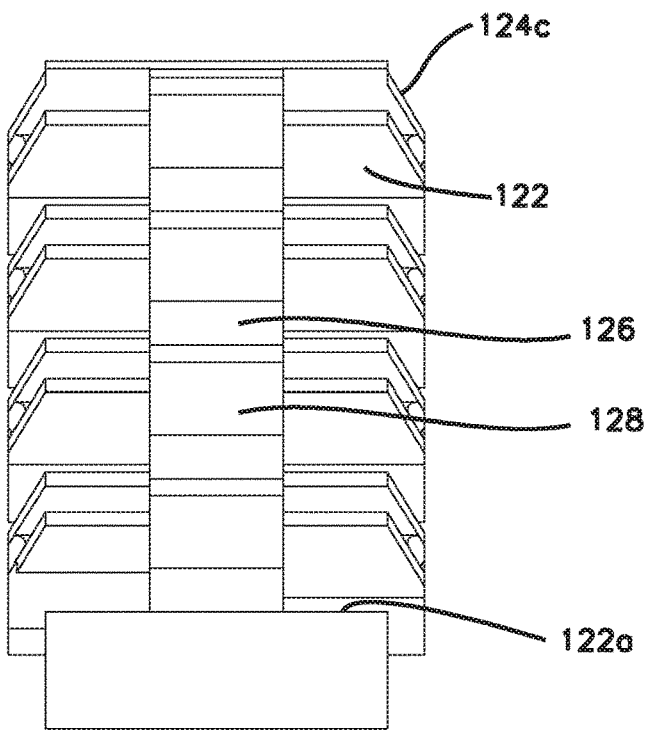
FIG. 17 is a front view of the tower structure shown in FIG. 13.
Figure 18:
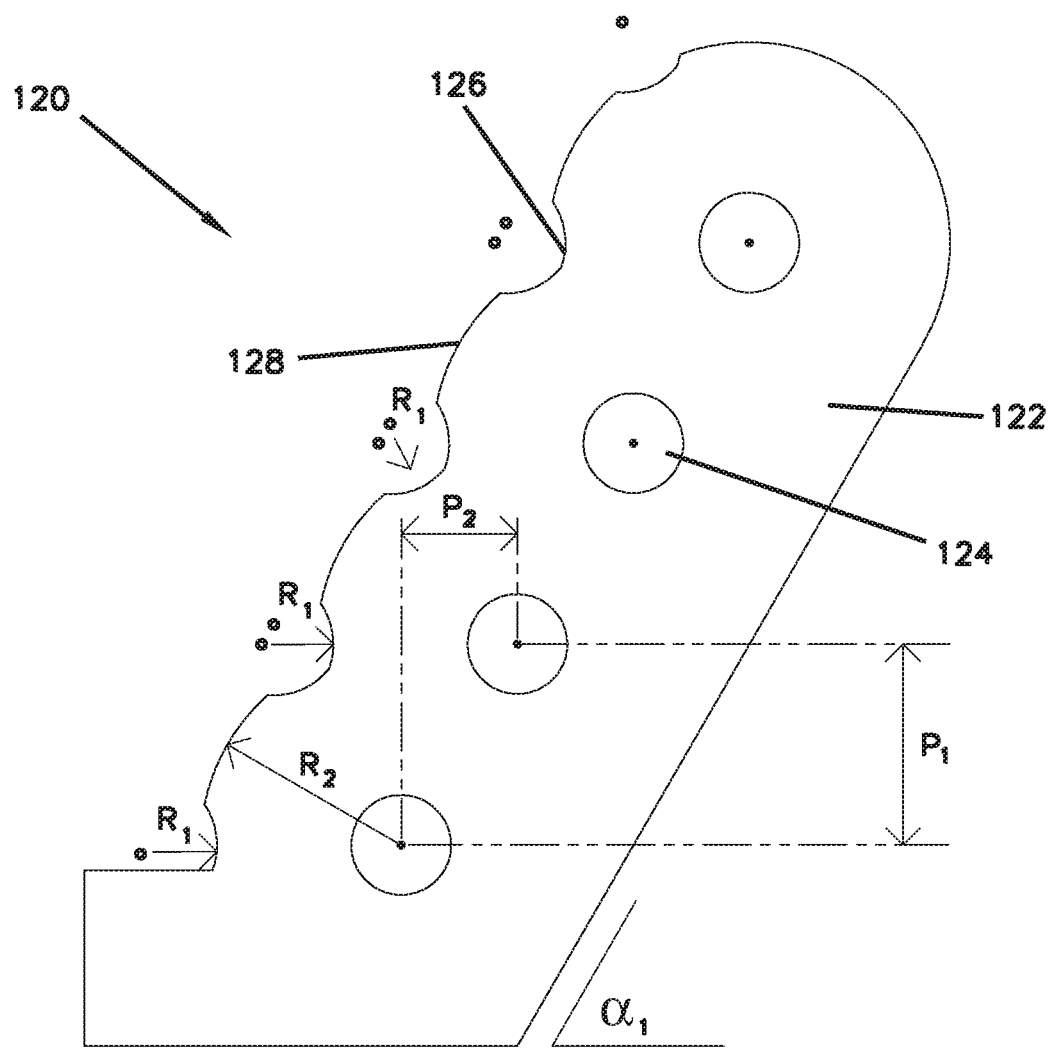
FIG. 18 is a schematic side view of the tower structure shown in FIG. 13.

Referring to FIGS. 5-7, the operation of the position retention structure 116 with respect to the tower structure is most easily seen. FIG. 5 shows a single tray 110 in multiple positions, with the tray being shown in a first or lowered position 110-p1, in a third or raised position 110-p3, and a second or intermediate position 110-p2 between the raised and first or lowered positions. In the first or lowered position 110-p1, the leaf spring member 116c is received into the recess 126a that is horizontally aligned (as shown on the page) with the aperture 124 into which the projections 114 of the tray 110 are received. In this position, the leaf spring member 116c is in a generally relaxed position, as illustrated at FIG. 7, wherein the support arms 116a, 116b are in a non-deflected state (i.e. parallel to the hinge arms 114a, 114b). As the tray 110 is installed in the bottommost position, the bottom of the tray 110 is supported by a support surface 122a of the tower structure main body 122. Trays 110 mounted above this position are supported by the tray 110 below.

When the tray 110 is rotated into the third or raised position 110-p3, the leaf spring member 116c is snapped out of the recess 126a associated with the first or lowered position and into the adjacent recess 126b. By placing any of the trays 110 into the third or raised position 110-p3, the interior region 112c of the immediately below tray 110 remaining in the first or lowered position 110-p1 can be more readily accessed. The interaction between the leaf spring member 116c and the recesses 126 is such that a significant rotational force must be applied in order to remove the leaf spring member 116c from the recess 126. Thus, once the tray 110 has been rotated into the third or raised positions 110-p3, the tray 110 is easily held in position by the leaf spring member 116c. FIG. 7 also shows the position of the leaf spring member 116c when the tray 110 has been rotated into the third or raised position 110-p3.

Figure 4:
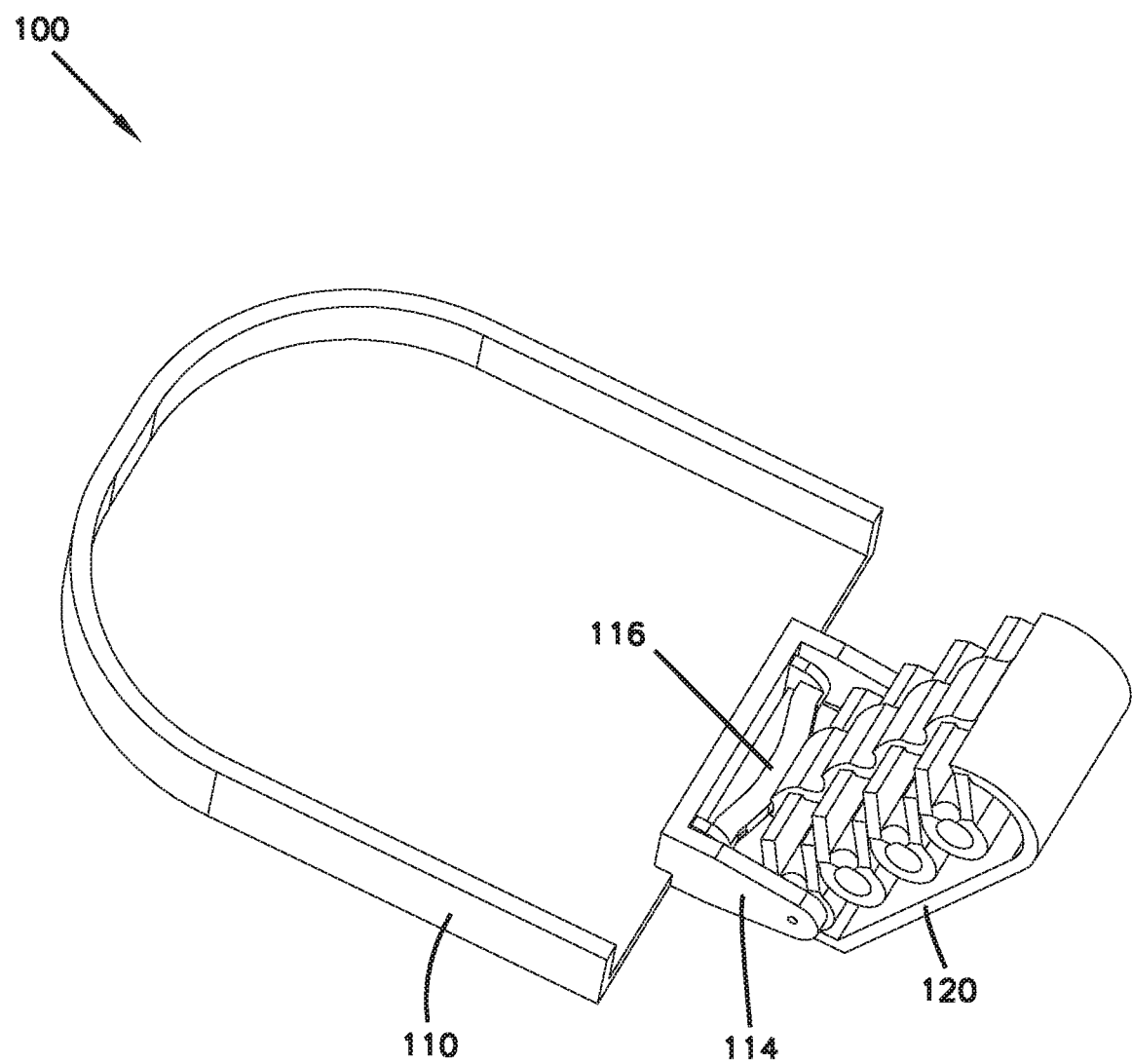
FIG. 4 is a perspective view of the telecommunications tray assembly shown in FIG. 1, with only a single tray installed.

In order to rotate the tray from the first or lowered position 110-p1 to the third or raised position 110-p3, or vice-versa, the tray 110 must be rotated through a second or intermediate position 110-p2 in which the leaf spring member 116c must snap out of one recesses 126a, 126b and ride along the bridge member 128 before snapping back into the other recess 126a, 126b. When sufficient rotational force is applied to the tray 110 to move the tray 110 into the second or intermediate position 110-p2, the contact between the leaf spring member 116c and the bridge member 128 forces the leaf spring member 116c to deflect in a direction away from the bridge member 128 (i.e. the leaf spring member 116c deflects towards the tray portion 112 and away from the hinge projections 114c). This action in turn forces an outward deflection of the support arms 116a, 116b, as can be seen at FIG. 6 4. As the support arms 116a, 116b are spaced away from an inwardly of the hinge arms 114a, 114b, the support arms 116a, 116b do not contact the hinge arms 114a, 114b. This configuration thus advantageously reduces or eliminates forces exerted on the leaf spring member 116c from being further transmitted to the hinge arms 114 that might otherwise compromise the hinging action between the projections 114d and the recesses 124 and/or cause excessive fatiguing of the hinge arms 114a, 114b. It is noted that the bridge member 128 is curved such that the leaf spring member 116c can more easily ride along the bridge member 128.

It is noted that the spacing and configuration of the recesses 126 allows for multiple trays 110 to be rotated together simultaneously between the first or lowered positions 110-p1 to the third or raised positions 110-p3. The trays 110 can also be rotated one at a time. With either approach, the interior region 112c of any tray 110 can be readily accessed by rotating the above trays 110 into the third or raised position 110-p3. As each tray 100 in the third or raised position 110-p3 is independently supported, it is not necessary for any below tray 110 to support the weight of the trays above the tray 110, as is the case with prior art designs using a support member on each tray that supports that tray and all trays above. Additionally, as the trays 110 are each independently retained in the first or lowered position 110-p1, it is not necessary to provide a Velcro strap to restrain the trays in this position, as is the case with some prior art designs. Although each tray 110 is shown as being positionable between two indexed positions defined by the recesses 126, additional recesses 126 could be provided such that the tray 100 can be rotated into more than two indexed positions.

The disclosed design is also advantageous in that both tactile and audible feedback are provided by the snapping action of the leaf spring member 116c into and out of the recesses 126. Thus, an operator can readily ascertain when the tray 110 has been sufficiently rotated into or out of the first or lowered position 110-p1 and into or out of the third or raised position 110-p3. In this way, the recesses 126 and leaf spring member 116c perform a position indexing function. Accordingly, the positions 110-p1 and 110-p3 can be characterized as indexed positions. As the trays 110 are automatically retained into the third or raised position 110-p3, the operator does not need to perform any further actions to secure the trays 110 into this position. As the trays 110 are positively retained in the position entirely by the interaction between the leaf spring member 116c and the recesses 126, the trays 110 can also be characterized as being auto-latching. Although the disclosed tray assembly 100 is shown with a spring member 116c located on the tray and recesses 124 located on the tower structure 120, it is possible to reverse these features such that the tower structure 120 is provided with multiple spring members and the tray forms a corresponding recess for receiving the spring members.

Figure 19:
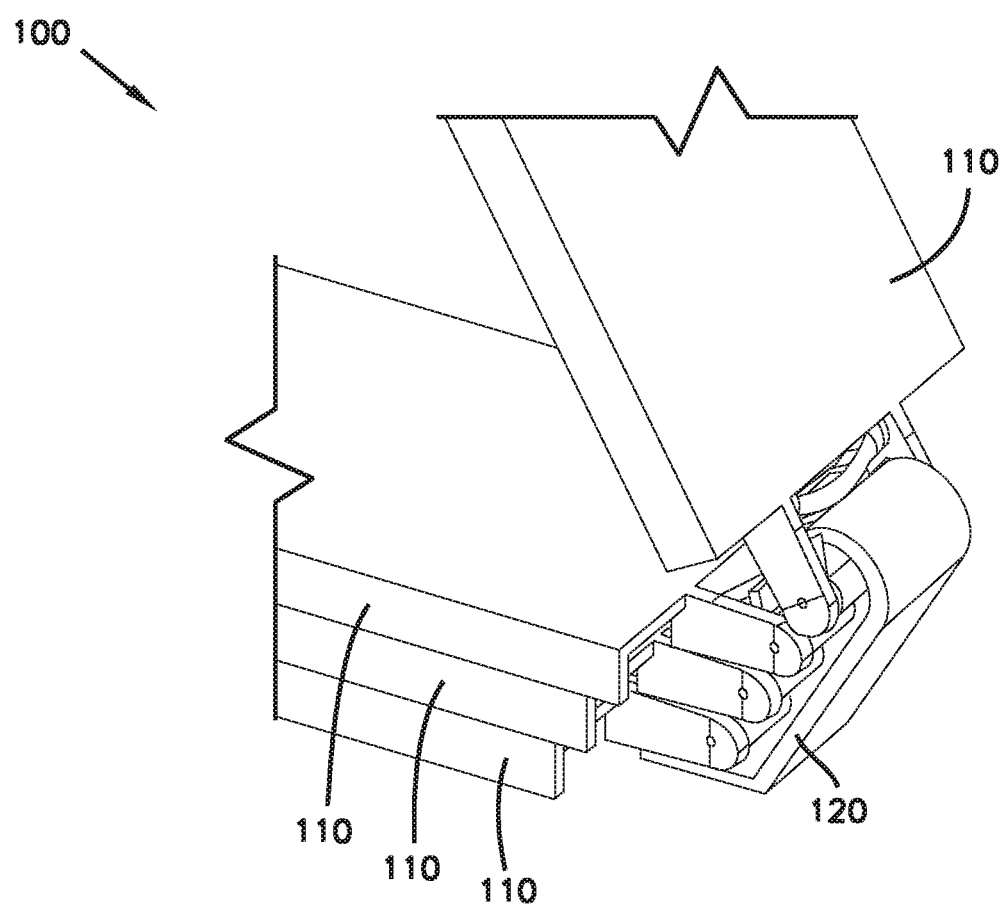
FIG. 19 is a perspective view of the telecommunications tray assembly shown in FIG. 1, with the trays installed in an orientation 180 degrees to that shown in FIG. 1.

Referring to FIG. 19, it can be seen that the trays 110 can be installed in an opposite orientation on the same tower structure 120 such that the interior regions 112c are facing in a downward direction (on the page) in comparison to the arrangement shown at FIG. 1.

Figure 20:
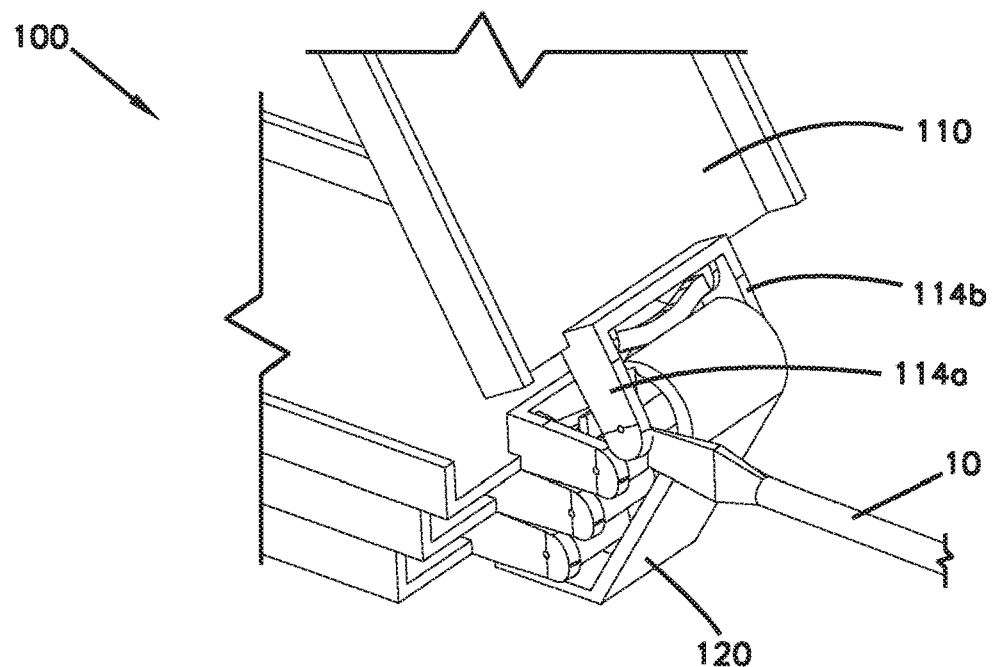
FIG. 20, is a perspective view of the tray assembly shown in Figure showing a first tray removal step.
Figure 21:
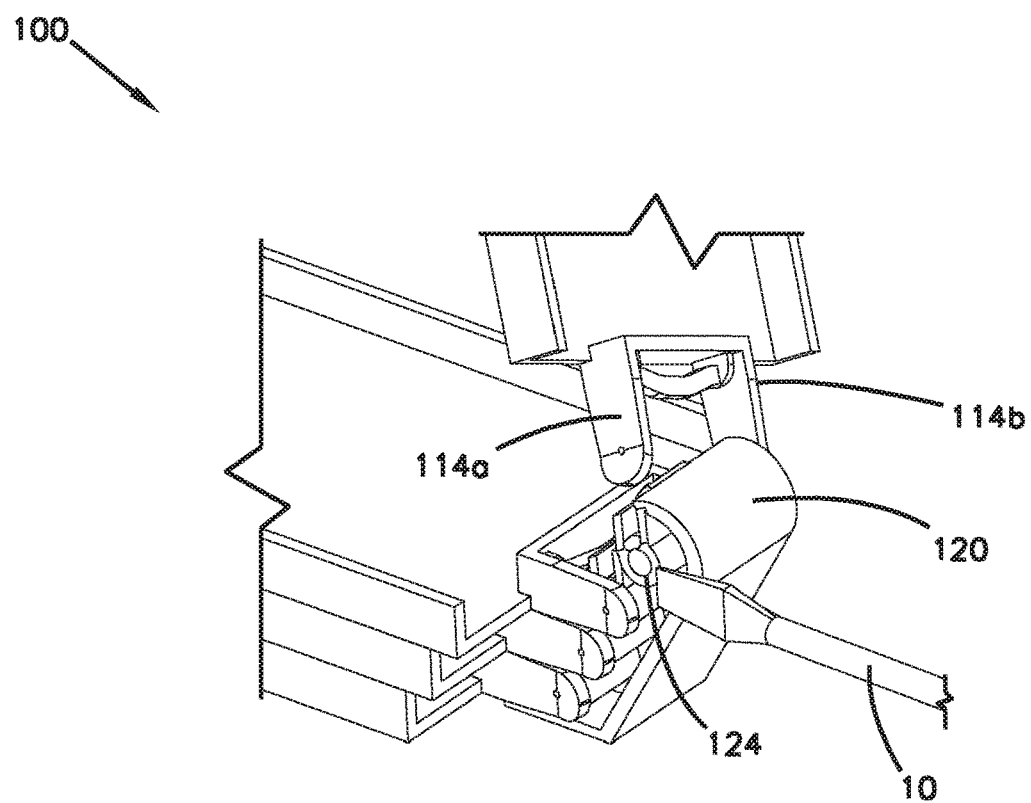
FIG. 21, is a perspective view of the tray assembly shown in Figure showing a second tray removal step.
Figure 22:
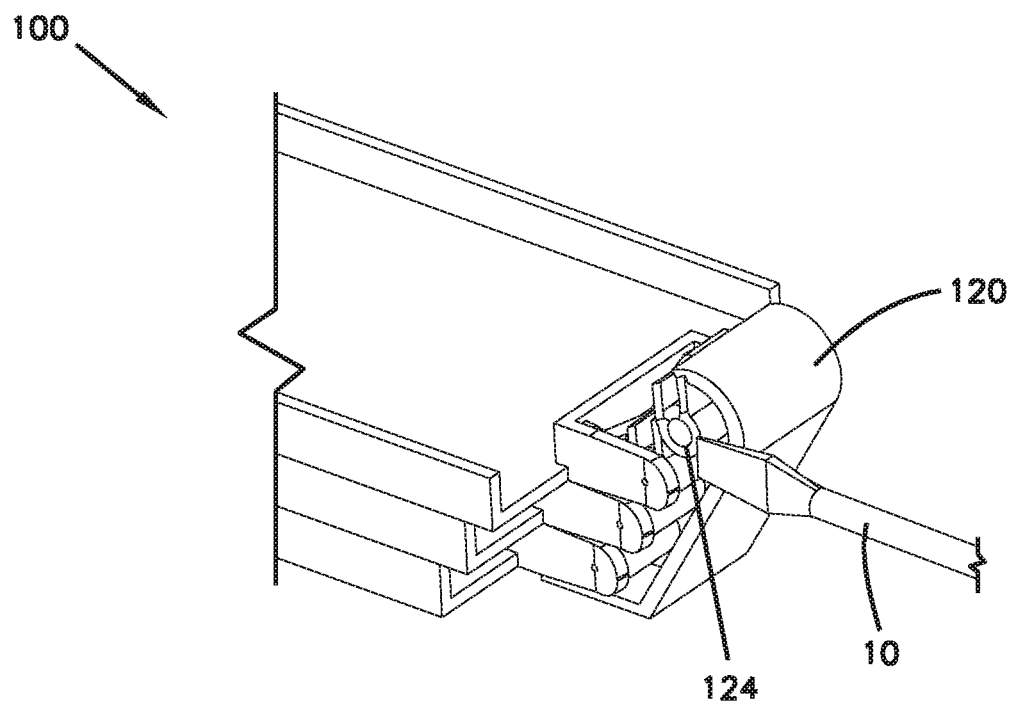
FIG. 22, is a perspective view of the tray assembly shown in Figure showing a third tray removal step.

Referring to FIGS. 20-21, it can be seen that a tool 10, such as a flathead screwdriver, can be used to remove a tray 110 from the tower structure 120. FIG. 20 shows the tool 10 inserted between the tower structure 120 and a hinge arm 114a. Once the tool 10 is placed in this position, the tool 10 is rotated to force the projection 114d out of the recess 124, as shown in FIG. 21. Once this position is reached, the tray 110 can be rotated such that the hinge arm 114a is clear of the tower structure 120 such that the projection 114d on the other side can be also be removed from the recess 124. The tray 110 can then be fully removed, as shown at FIG. 22.

Figure 23:
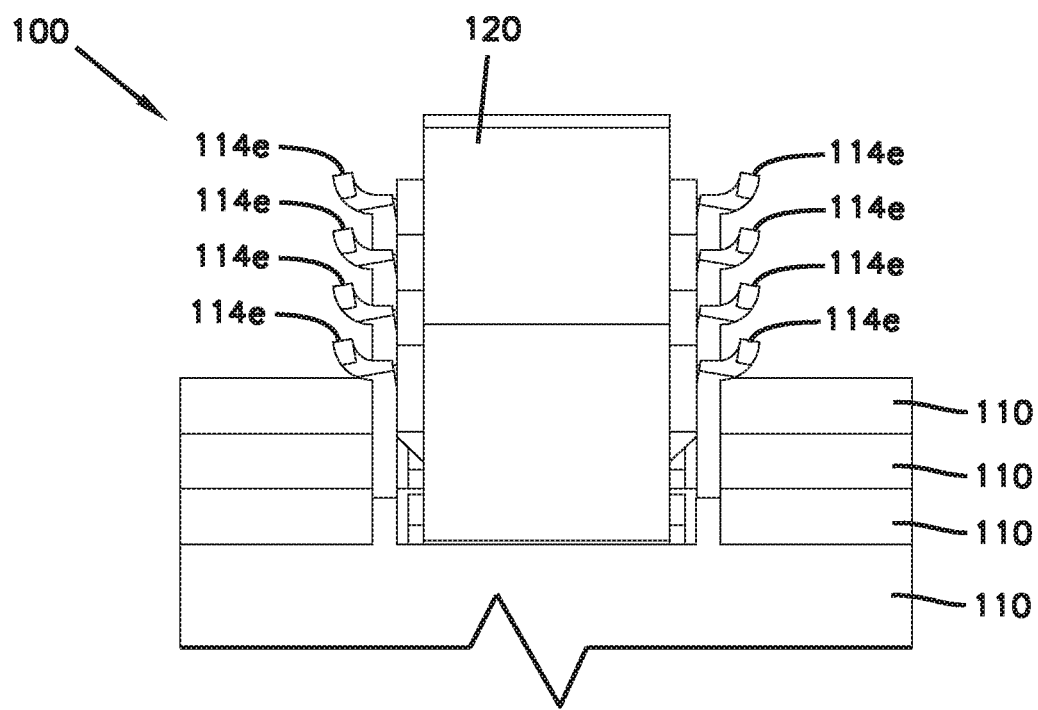
FIG. 23 is a bottom view of the tray assembly shown in FIG. 1, utilizing an alternative tray design.
Figure 24:
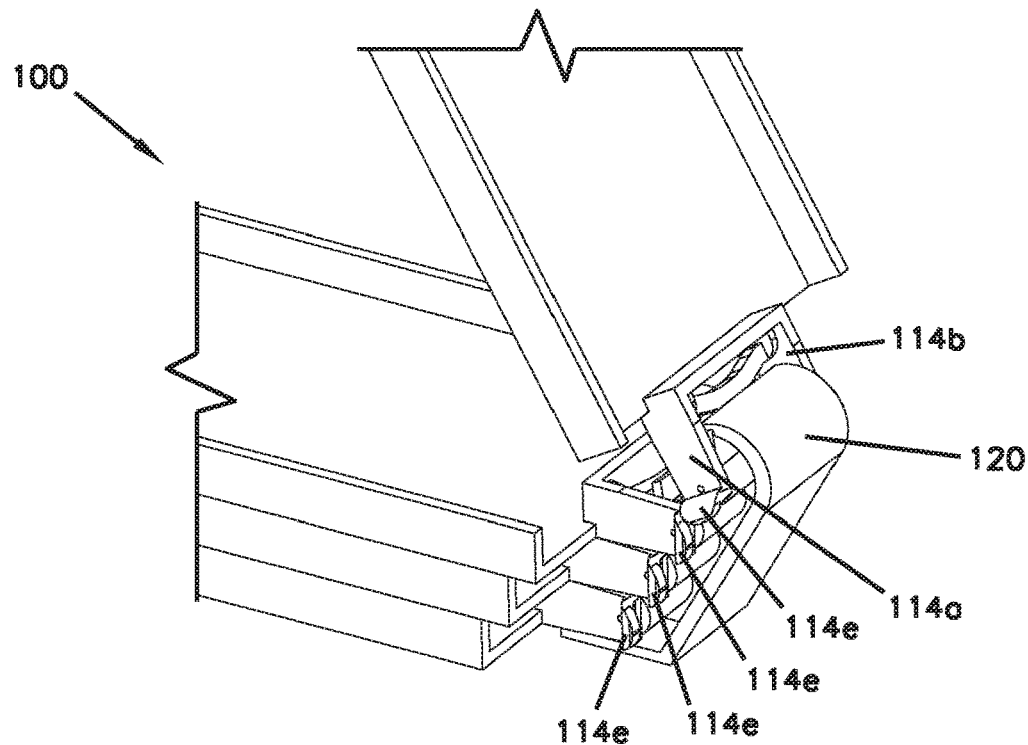
FIG. 24 is a top perspective view of the tray assembly shown in FIG. 23.
Figure 25:
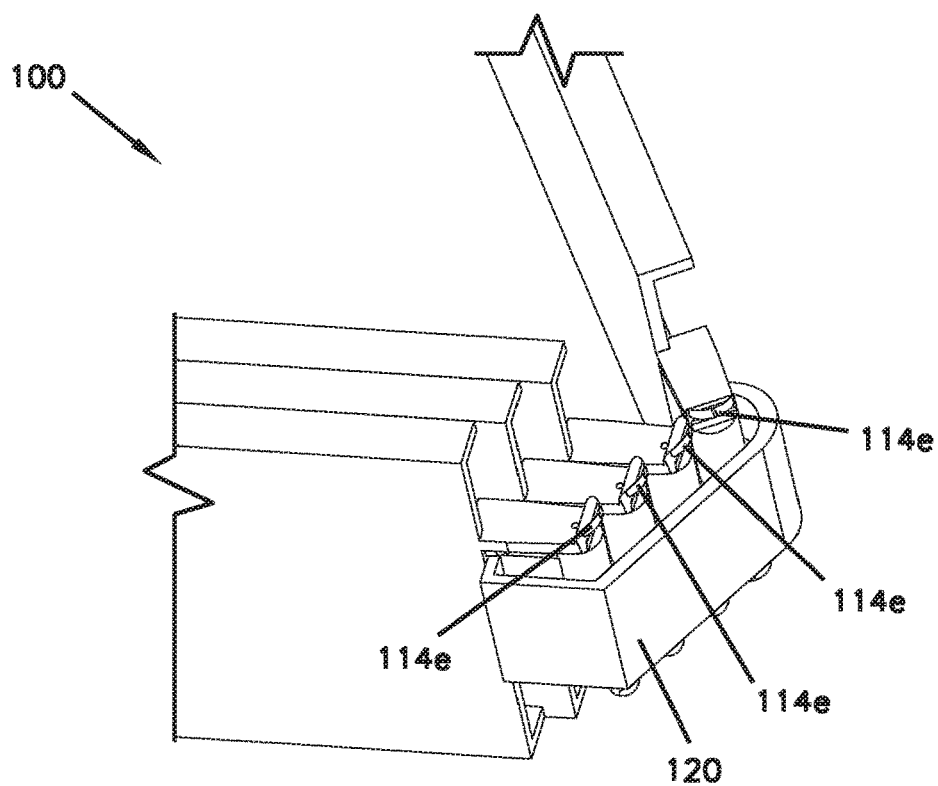
FIG. 25 is a bottom perspective view of the tray assembly shown in FIG. 23.
Figure 26:
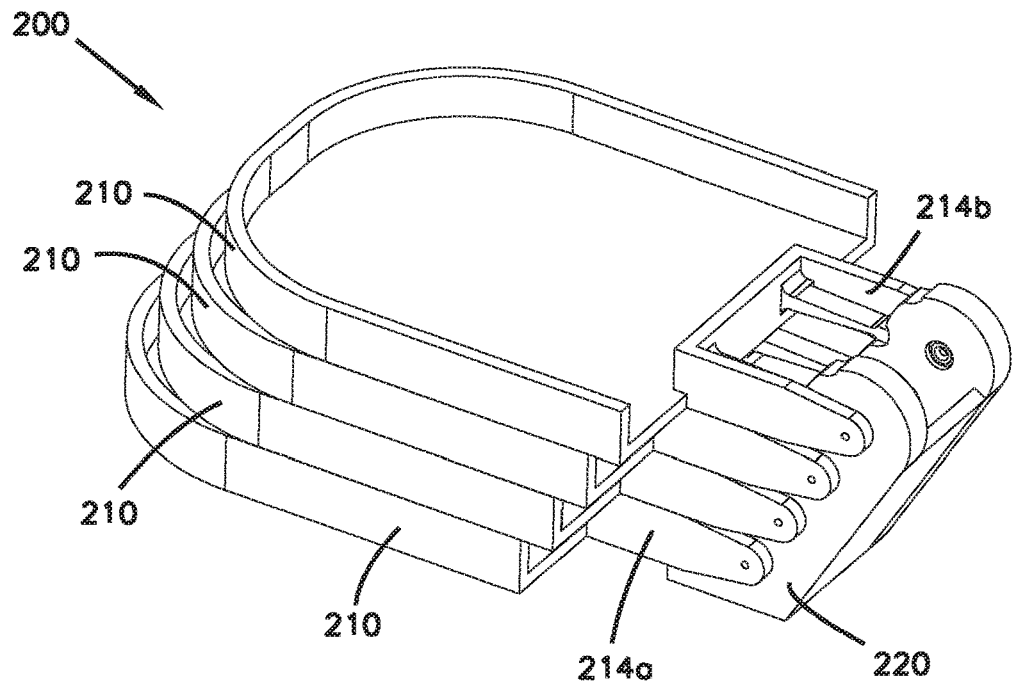
FIG. 26 is a perspective view of a second example of a telecommunications tray assembly in accordance with principles presented herein.
Figure 27:
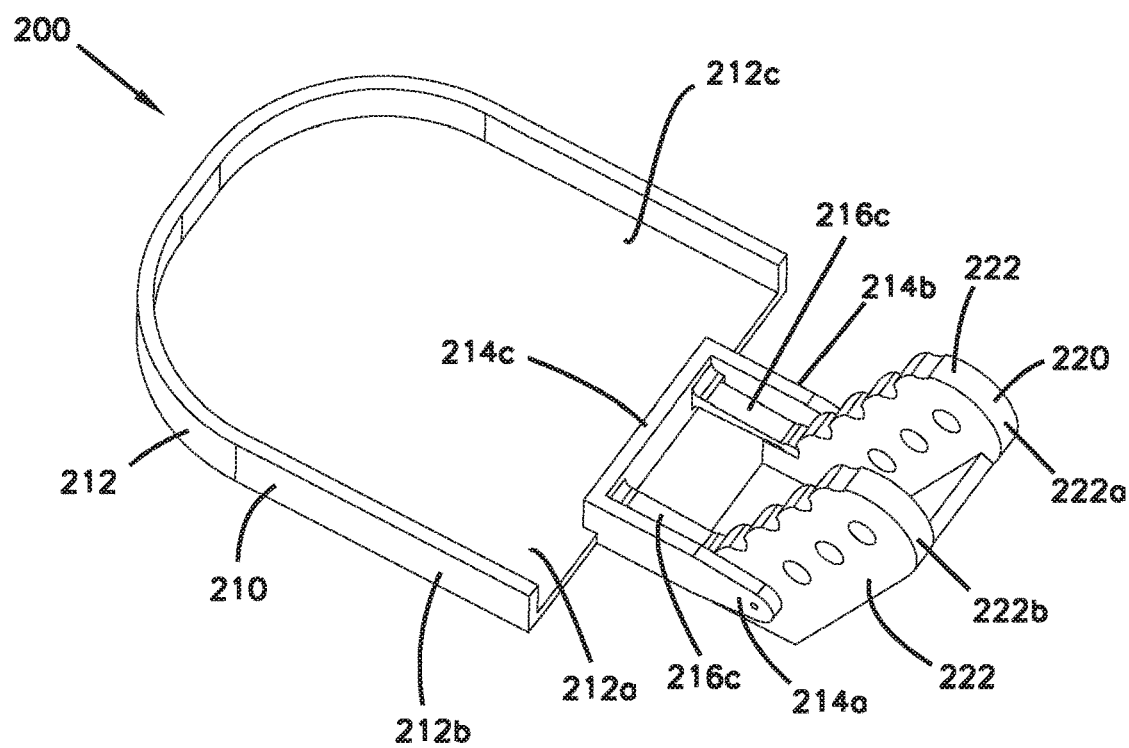
FIG. 27 is a perspective view of the telecommunications tray assembly shown in FIG. 26, with only a single tray installed.
Figure 28:
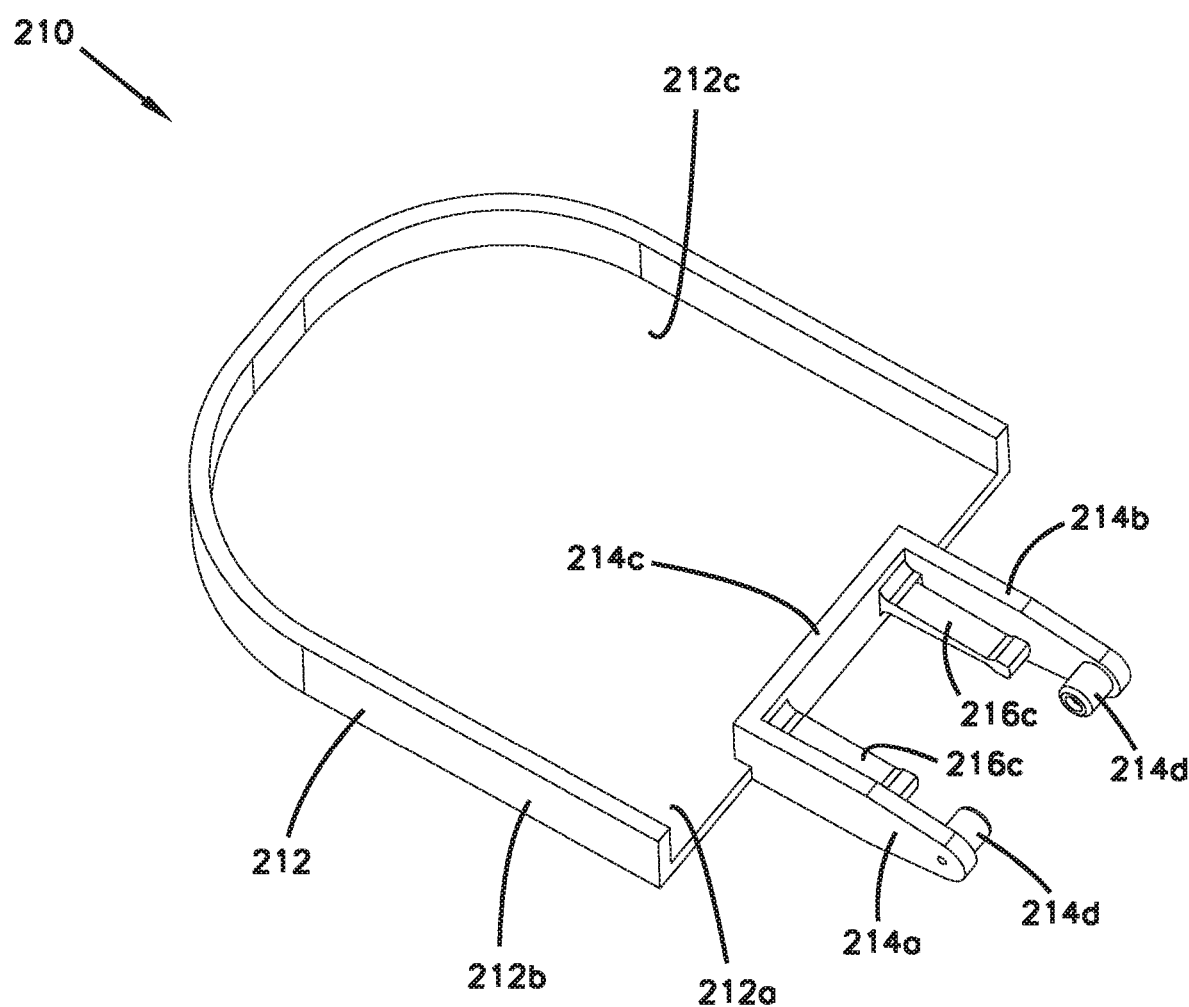
FIG. 28 is a perspective view of a tray of the tray assembly shown in FIG. 26.
Figure 29:
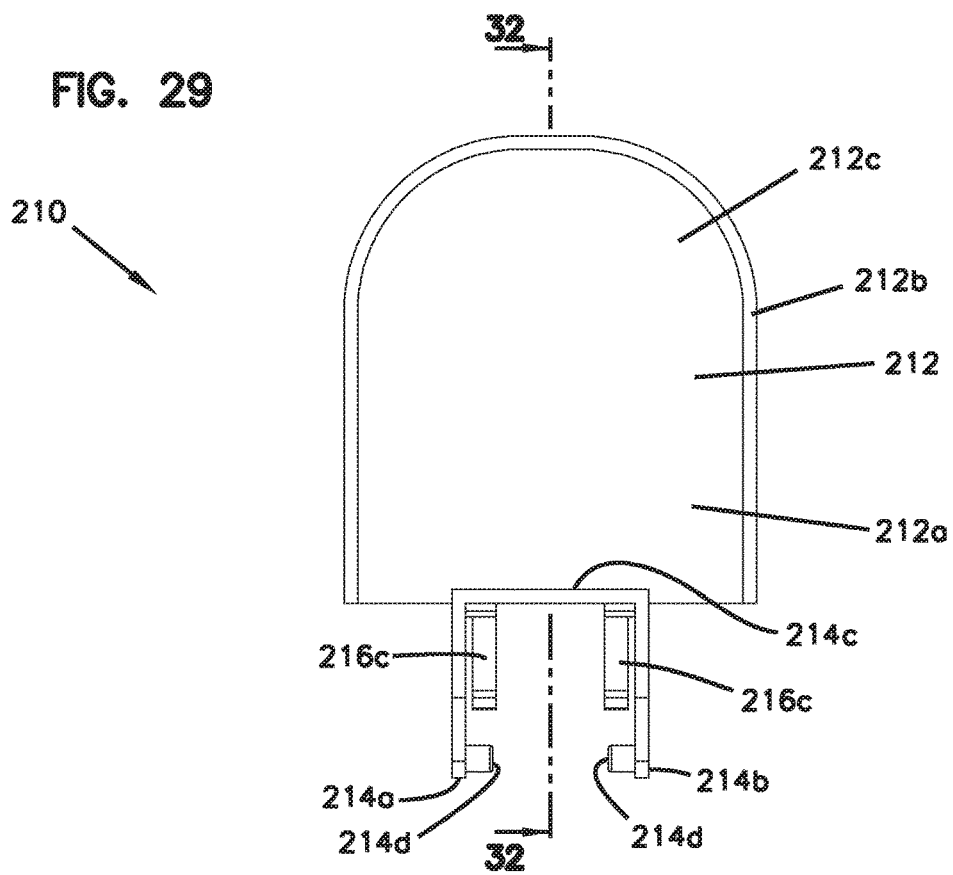
FIG. 29 is a top view of the tray shown in FIG. 28.
Figure 30:
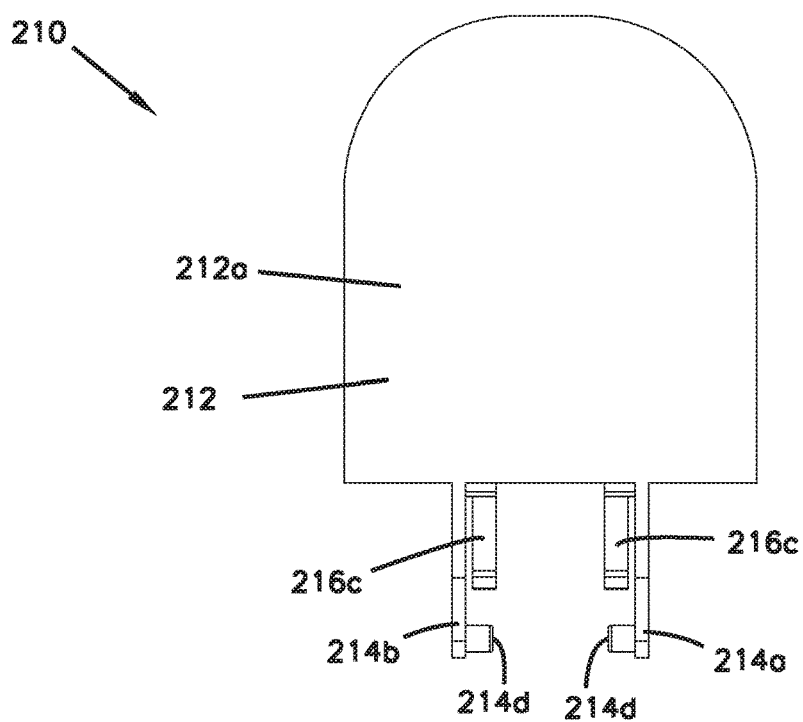
FIG. 30 is a bottom view of the tray shown in FIG. 28.
Figure 31:
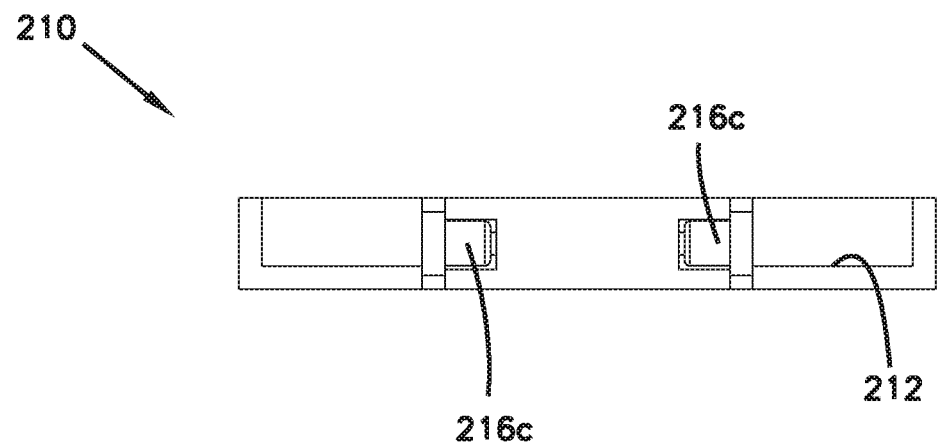
FIG. 31 is an end view of the tray shown in FIG. 28.
Figure 32:
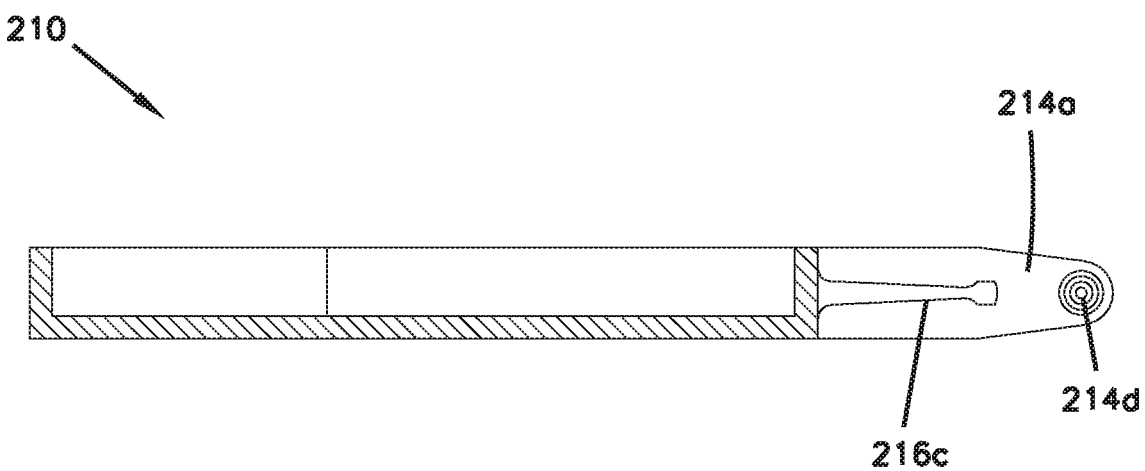
FIG. 32 is a longitudinal cross-sectional view of the tray shown in FIG. 28.

Referring to FIGS. 23-25, a tray variation is shown in which the use of the tool 10 is not necessary in order to facilitate removal of the trays 110. As shown, the hinge arms 114a, 114b of the trays are each provided with a handle or tab portion 114e. The handle or tab portions 114e extend from an end of the hinge arms 114a, 114b in a laterally outward direction from the associated hinge arms 114a, 114b and then curve back at an oblique angle to the hinge arms 114a, 114b to provide a tactile surface for an operator's finger. The handle or tab portions 114e can thus be used by the user to manually deflect the hinge arms 114a, 114b away from the tower structure 120 to release the projections 114d from the recesses 124.

Referring to FIGS. 26-42, a second example of a tray assembly 200 is presented. As many features of the tray assembly 200 are similar to those of tray assembly 100, the description for tray assembly 100 is largely applicable for tray assembly 200. For example, the profile of apertures, recesses, and apertures of the tower structure 120 is generally the same for tower structure 220. Thus, the description of tray assembly 200 will be limited to the differences over tray assembly 100.

The primary distinguishing feature of the tray assembly 200 is that a different position retention structure 216 is utilized in which a pair of independent spring members 216c projecting from the sidewall 214c are utilized. As with support arms 116a, 116b, spring members 216c are inwardly spaced from the hinge arms 214a, 214b and run generally parallel to the hinge arms 214a, 214b. The tower structure 220 is also shown as having a corresponding pair of members 222b, 222c with each having apertures 224, recesses 226, and bridge members 228 for interacting with the spring members 216c. Thus, tray assembly 200 has the same advantage of tray assembly 100 in that forces exerted onto the spring members 216c are not transmitted to the hinge arms 214a, 214b which could otherwise compromise the operation or service life of the hinge structure.

Figure 33:
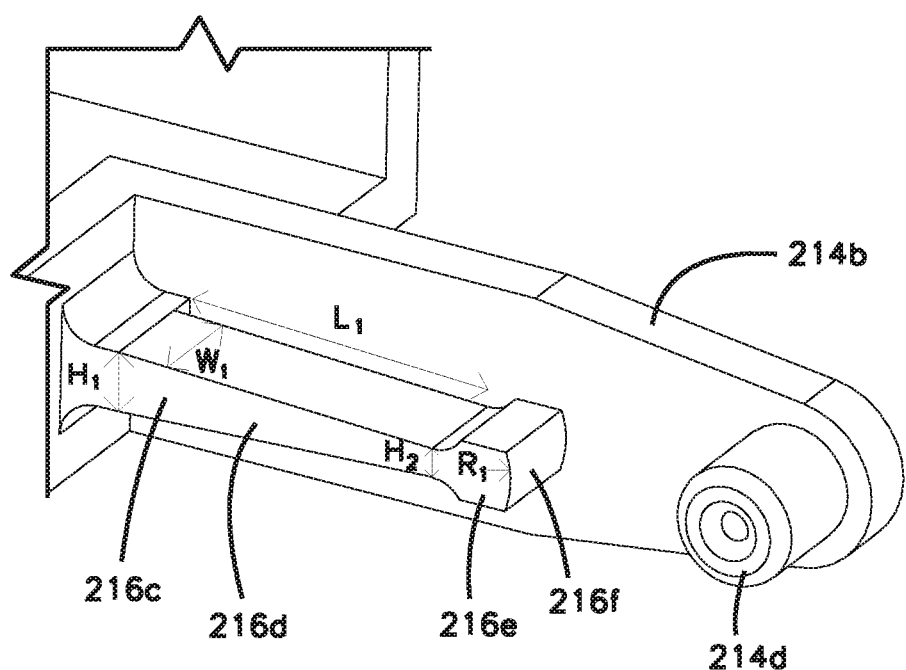
FIG. 33 is a partial perspective view of the tray shown in FIG. 28.
Figure 34:
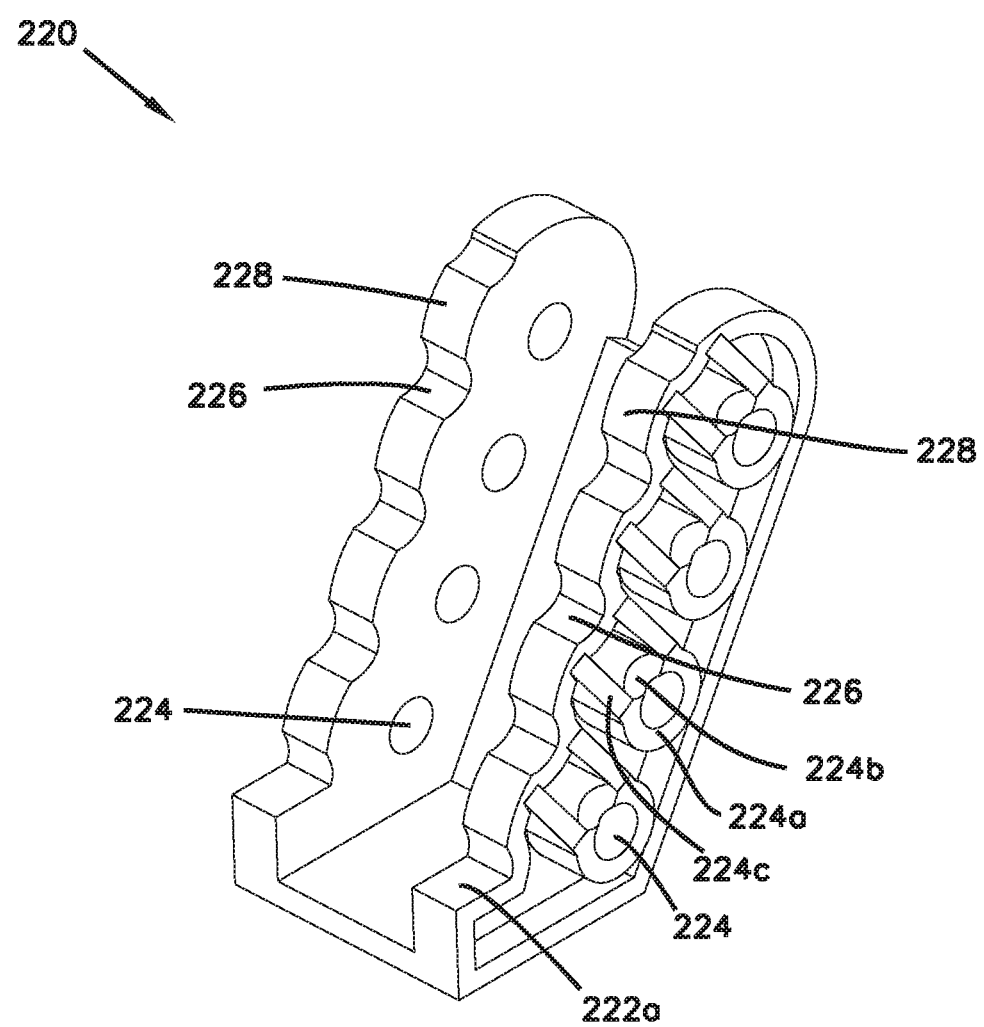
FIG. 34 is a perspective view of a tower structure of the tray assembly shown in FIG. 26.
Figure 35:
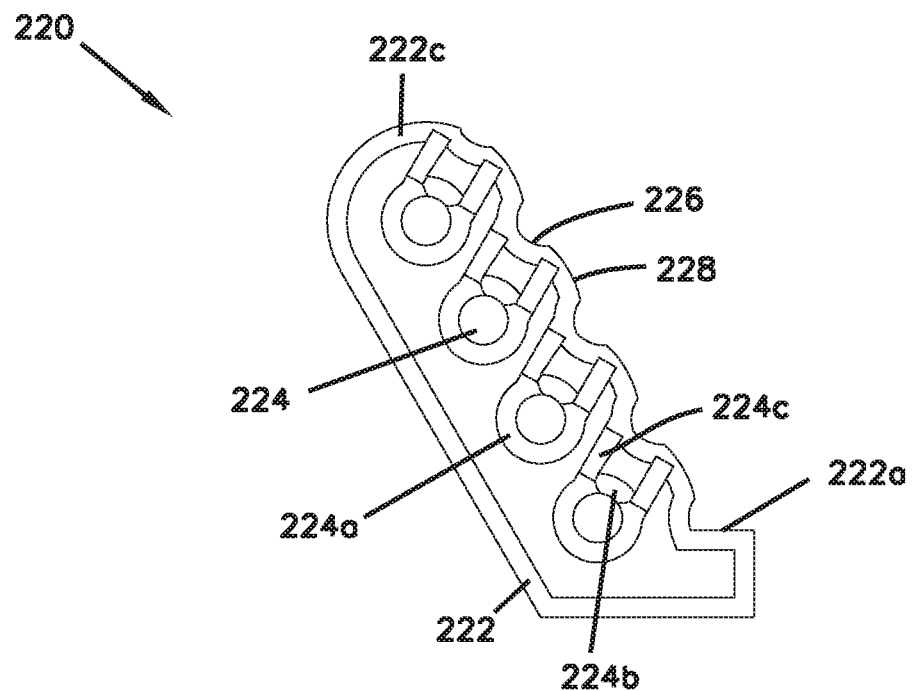
FIG. 35 is a first side view of the tower structure shown in FIG. 34.
Figure 36:
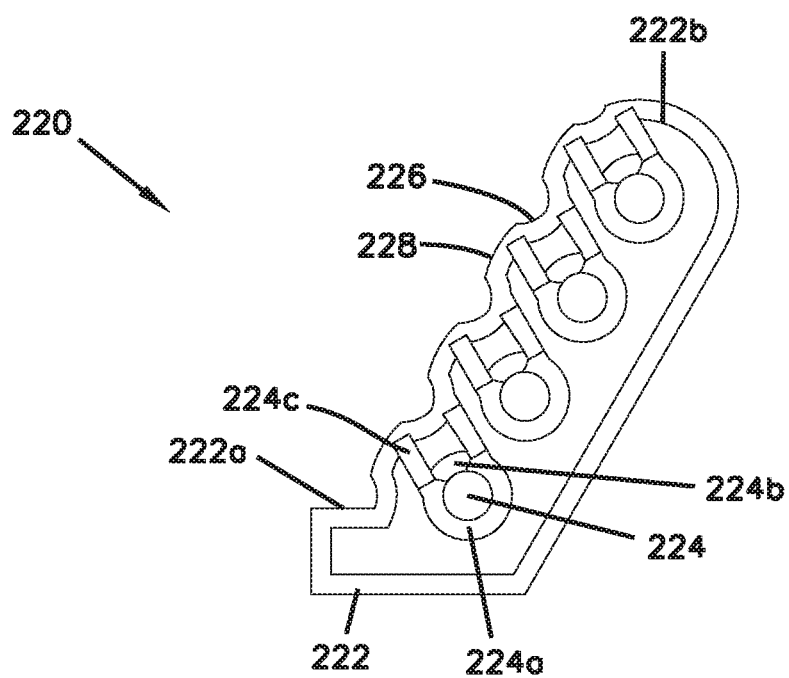
FIG. 36 is a second side view of the tower structure shown in FIG. 34.
Figure 37:
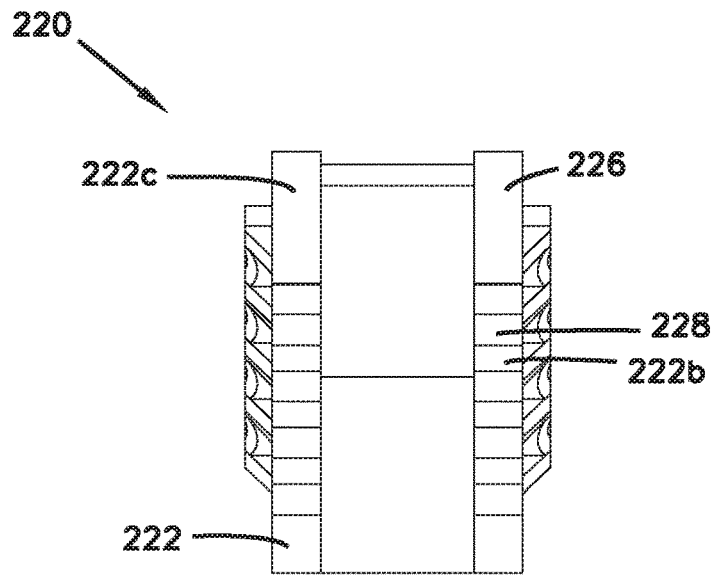
FIG. 37 is a top view of the tower structure shown in FIG. 34.
Figure 38:
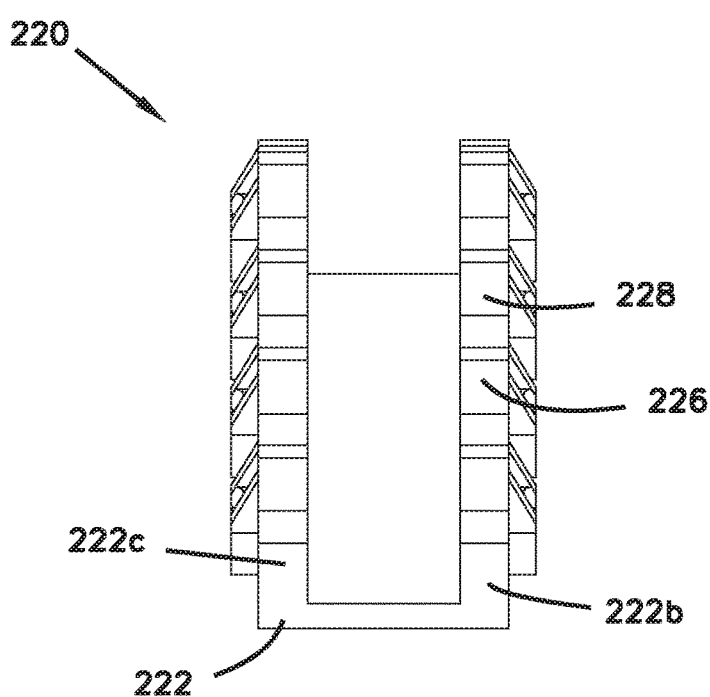
FIG. 38 is a front view of the tower structure shown in FIG. 34.

As most easily seen at FIG. 33, each spring member 116c is structured as a deflectable cantilevered beam with a main portion 216d extending from the sidewall 214c along a first length L1. As shown, the main portion 216d has a first width W1 and tapers from a height H1 to a second height H2, wherein height H2 is less than height H1. The spring member 216c is also provided with a head portion 216e at the distal end of the main portion 216d. The head portion 216e defines an outer surface 216f having a radius R3. During rotation of the tray 210, the head portion outer surface 216f engages with the recesses 226 and bridge portions 228 of the tower structure 220 to result in a similar indexing or auto-latching function described for tray assembly 100. It is noted that the tray assembly 100 can be provided with a shorter overall length as compared to tray assembly 200 as the spring member 116c is oriented in a transverse direction to the tray 110 and tower structure 120 rather than being oriented in a lengthwise direction (i.e. direction of length L1) as is the case with tray assembly 200.

Figure 39:
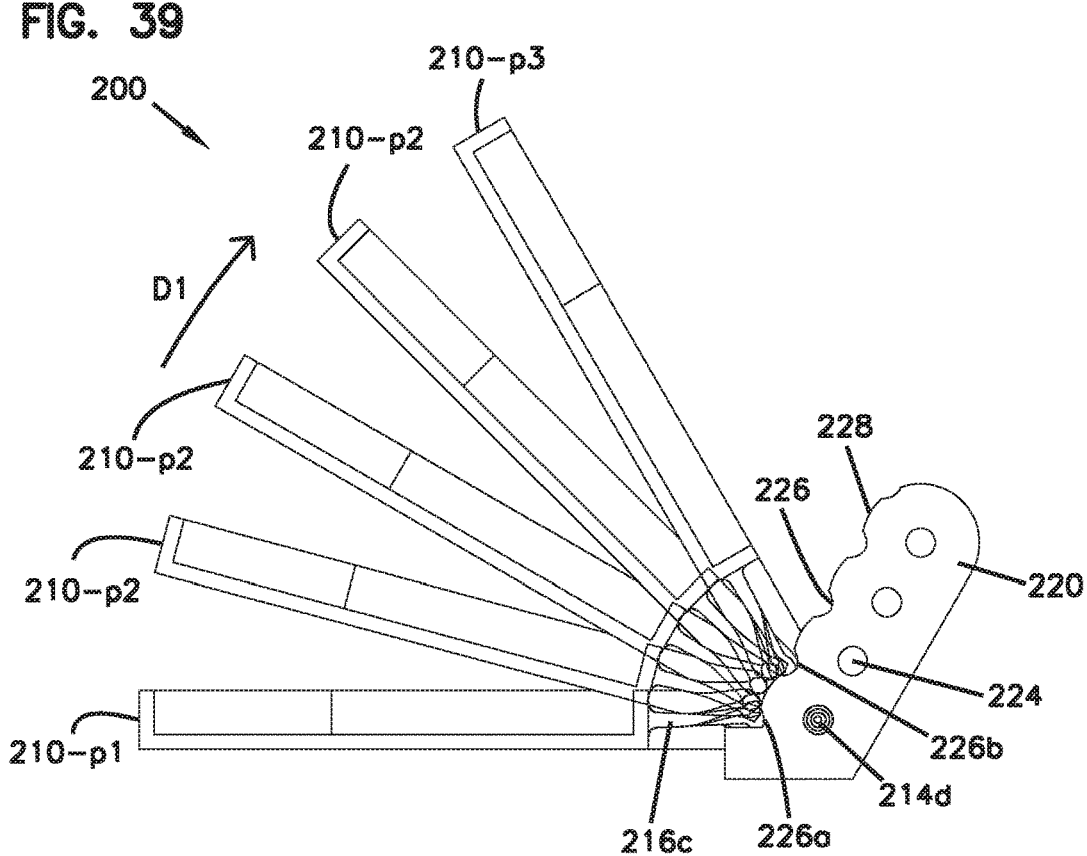
FIG. 39 is a side view of the telecommunications tray assembly shown in FIG. 26, with a single tray shown in multiple possible positions moving from a first or lowered position to a third or raised position.
Figure 40:
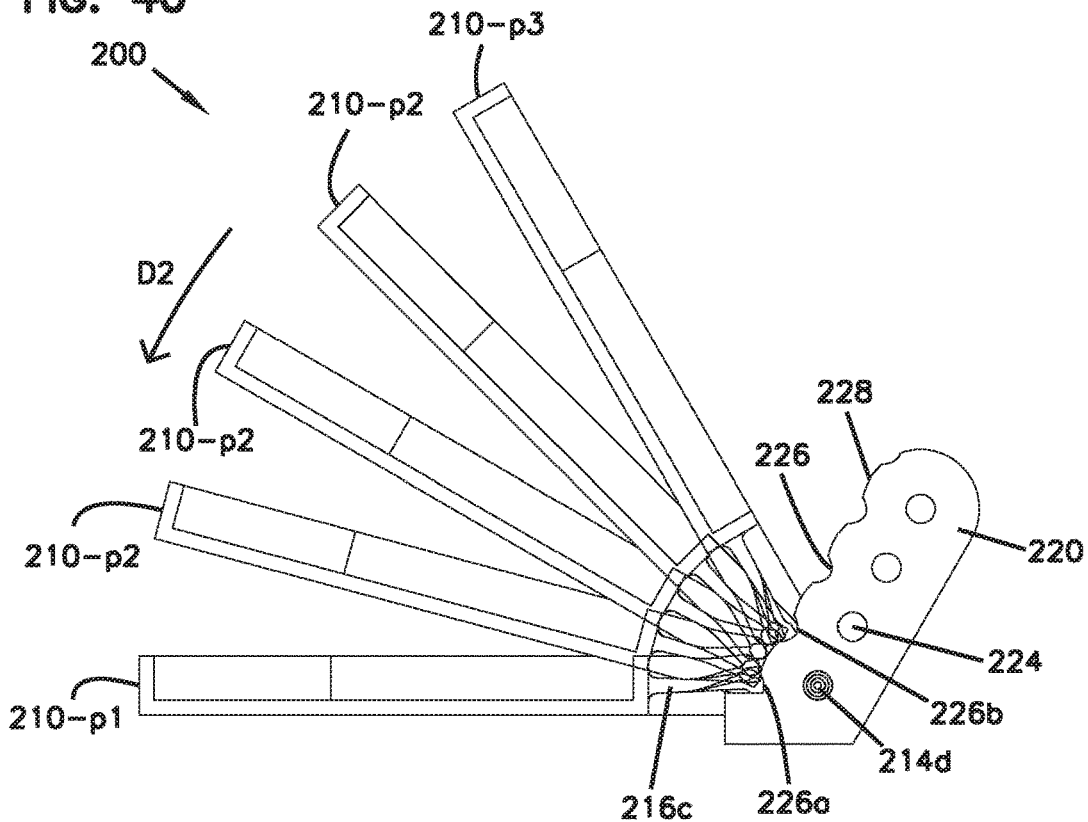
FIG. 40 is a side view of the telecommunications tray assembly shown in FIG. 39, with the tray shown in multiple possible positions moving from a third or raised position to a first or lowered position.
Figure 41:
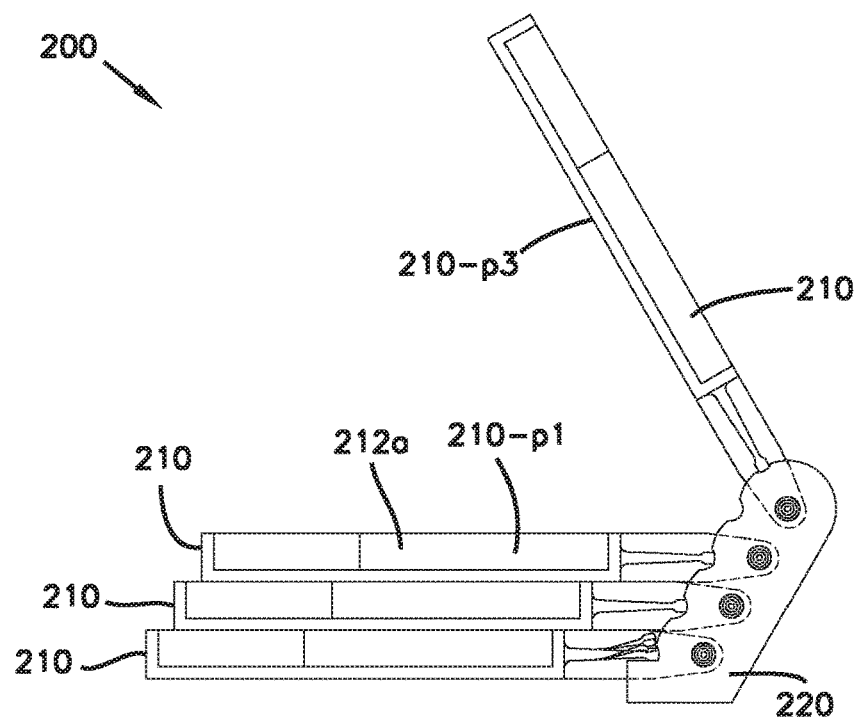
FIG. 41 is a side view of the telecommunication tray assembly shown in FIG. 26 with the uppermost tray being shown in a third or raised position and the bottom three trays being shown in a first or lowered position.
Figure 42:
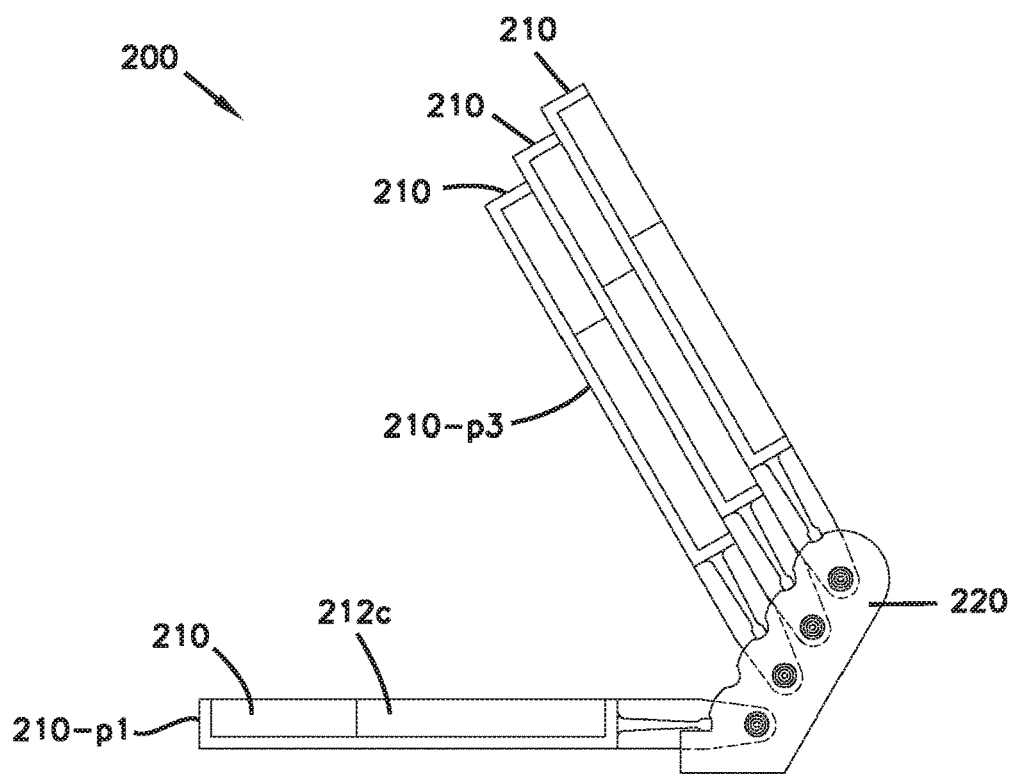
FIG. 42 is a side view of the telecommunication tray assembly shown in FIG. 26 with the upper three trays being shown in a third or raised position and the bottom tray being shown in a first or lowered position.
Figure 43:
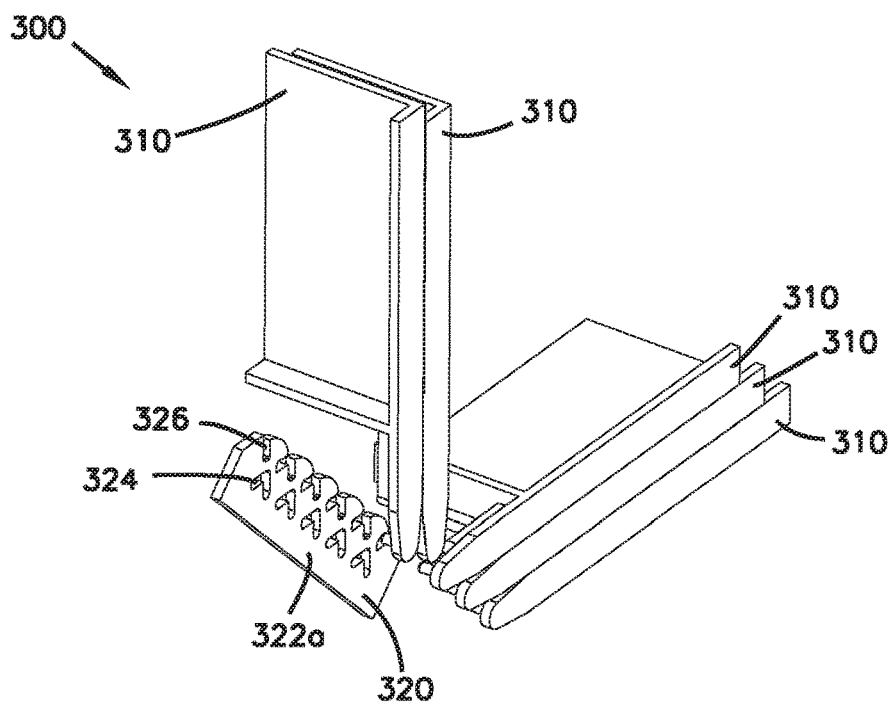
FIG. 43 is a partial perspective view of a third example of a telecommunications tray assembly in accordance with principles presented herein.

With reference to FIGS. 39 and 40, the interaction between the spring members 116c and the tower structure recesses 126 and bridge members 128 of the tower structure 120 is shown. FIG. 39 shows the tray 210 being rotated in a direction D1 from the first or lowered position 210-p1 to the third or raised position 210-p3 with multiple intermediate or second positions 210-p2 also being shown. As the tray 210 is being rotated in the direction D1, the main portions 216d deflect downwardly thereby allowing the head portion outer surface 216f to ride out of the recess 226a across the bridge portion 226 and then to snap into the recess 226b. Once in this position, the spring member main portion 216d can return to a relaxed or non-deflected state to positively retain the tray in the third or raised position 210-3. FIG. 40 shows the tray 210 being moved back from the third or raised position 210-3 to the first or lowered position 210-1, wherein the spring member main portion 216d deflects in an upward direction to allow the head portion 216d to eventually snap out of the recess 226b and into the recess 226a. As with the tray 110, the rotation between these positions provides both audible and tactile feedback to an operator, wherein the spring member 216 of each tray 210 has sufficient strength to independently hold the tray 210 in the third or raised position 210-p3. FIG. 41 shows one configuration in which the uppermost tray 210 is independently retained in the third or raised position 210-p3 by the spring members 216c such that the interior region 212c of the tray below can be accessed. FIG. 42 shows another configuration in which the three uppermost trays 210 are held in the third or raised position 210-p3 by the spring members 216c such that the interior region 212c of the bottommost tray 210 can be accessed.

Referring to FIGS. 43 to 48, a third example of a tray assembly 300 is presented. Tray assembly 300 is similar to tray assemblies 100 and 200 in that the trays 310 can be independently held and indexed into the first and third positions 310-p1, 310-p3 without the use of an additional support component. However, unlike tray assemblies 100 and 200, tray assembly 300 does not rely upon a spring member to index the trays into position. Rather, each tray 310 is provided with a pair of support arms 114a with each having a pin 314d and extension members 316 that are operated within slot structures of the tower structure 320 that enable each tray to be slid in and out from different locked positions 310-p1, 310-p3. As presented, the tower structure 320 is provided with a main body 322 having a pair of support members 322a, 322b with each defining a first array of slot structures 324 and a second array of slot structures 326. The pins 314d of each tray 310 are received and retained within one of the slot structures 324 while the extension members 316 of each tray 310 are received into a corresponding one of the slot structures 326. The slot structure 324 has a closed L-shape with a first portion 324a and a second portion 324b. In the orientation shown, the first portion 324a is horizontal and the second portion 324b is vertical. The slot structure 326 has an open L-shape with a first portion 326a and a second portion 326b. In the orientation shown, the first portion 326a is horizontal and the second portion 326b is vertical. As the slot structure 324 is closed, the pins 314d are always retained within a slot structure 324 unless the tray 310 is removed from the tower structure 320. The open, second slot structure 326 removably receives the extension members 316 of the tray 310.

Figure 44:
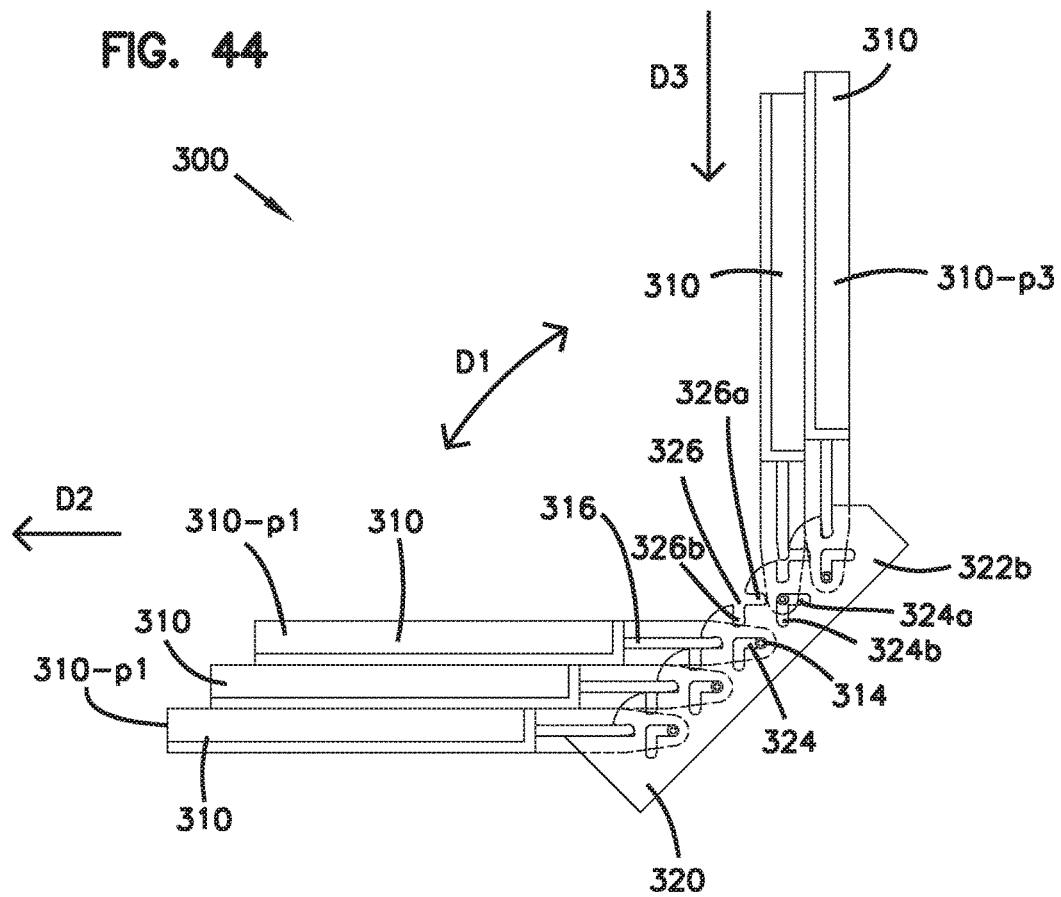
FIG. 44 is a side view of the telecommunications tray assembly shown in FIG. 43 with the two uppermost trays being shown in a third or raised position and the bottommost three trays being shown in a first or lowered position.
Figure 45:
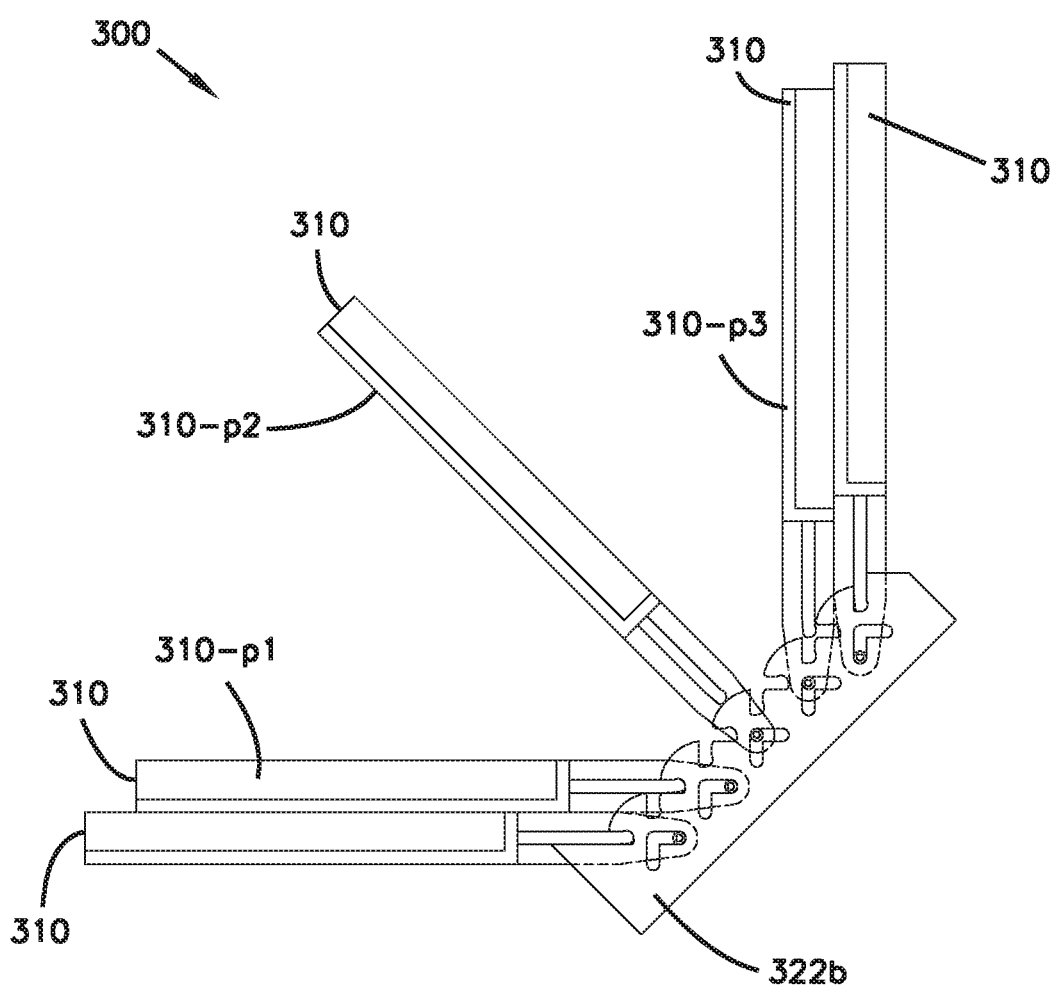
FIG. 45 is a side view of the telecommunications tray assembly shown in FIG. 43 with the two uppermost trays being shown in a third or raised position, the middle tray being shown in a second or intermediate position, and the bottommost two trays being shown in a first or lowered position.
Figure 46:
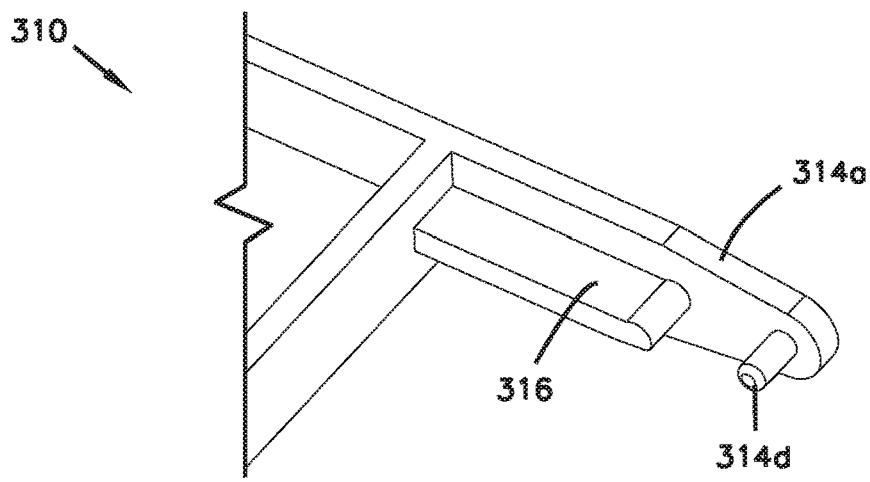
FIG. 46 is a partial perspective view of one of the trays shown in FIG. 43.
Figure 47:
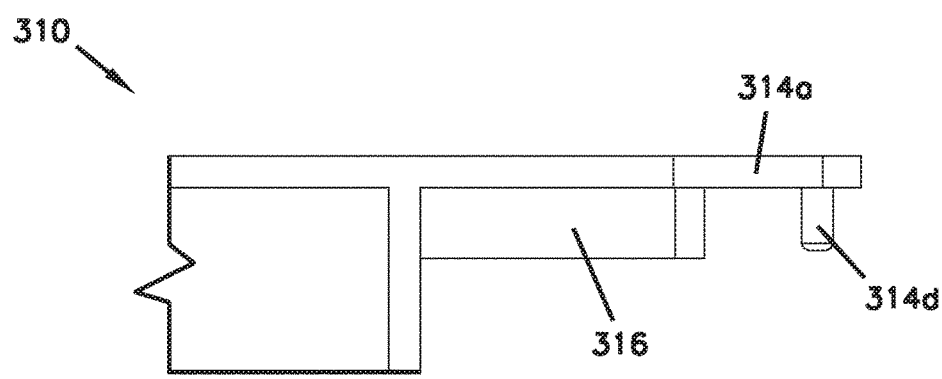
FIG. 47 is a top partial view of the tray shown in FIG. 46.
Figure 48:
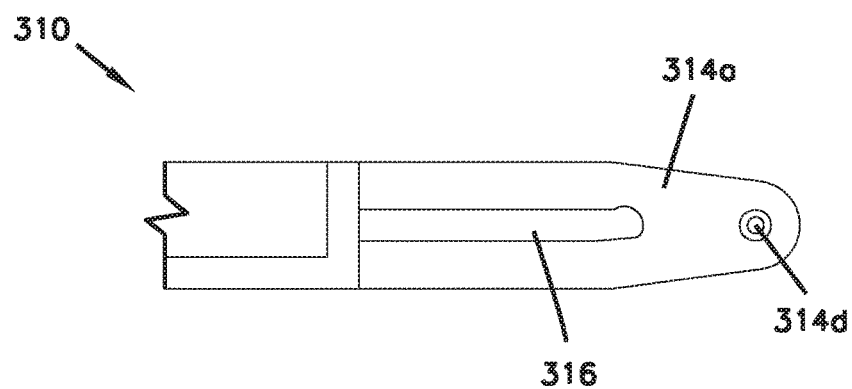
FIG. 48 is a partial cross-sectional view of the tray shown in FIG. 46.

When the tray 310 is in the first or lowered position 310-p1, the extension members 316 are received in the first portion 326a of the second slot structures 326 while the pins 314d are received in the first portion 324a of the first slot structure 324. In this position, the tray 310 is positively retained in the position 310-p1 without the need for any additional components. To move the tray 310 to the third or raised position 310-p3, the tray 310 is pulled in a direction D2 such that the extension members 316 are removed from the second slot structures 326 and the pins 314d are drawn over the first slot structure second portions 324b. In this position, the tray 310 can be rotated in the direction D1 through intermediate positions 310-p2 (see FIG. 45) until the tray is oriented to align with the next or adjacent second slot structure 326, which in this case is a vertical orientation of the tray 310. Once in this position, the tray 310 is moved in a direction D3 such that the extension members 316 are received by the second portion 326b of the second slot structure and the pins are pushed fully into the first slot structure second portions 324b. At this point, the tray 310 is now secured into the third or raised position 310-p3. Moving a tray 310 from the position 310-p3 to the position 310-p1 is simply the reverse of the above described procedure. FIG. 44 shows two trays 310 in the position 310-p3 and three trays in the position 310-p1 while FIG. 45 shows two trays 310 in the position 310-p3, three trays in the position 310-p1, and one tray 310 being moved through the intermediate positions 310-p2.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A telecommunications tray assembly comprising:
   a) a tower structure; and
   b) at least one hinged tray rotatably mounted to the tower structure, the hinged tray being rotatable between at least two indexed positions about a pivot axis, wherein the hinged tray is positively retained in the at least two indexed positions by a position retention structure, the position retention structure including a leaf spring member extending in a direction parallel to the pivot axis and between a pair of support arms, the leaf spring member being deflectable in a direction that is orthogonal to the pivot axis and away from the tower structure.

2. The telecommunications tray assembly of claim 1, wherein the at least one hinged tray includes a plurality of hinged trays.

3. The telecommunications tray assembly of claim 1, wherein the tower structure includes a first recess and a second recess, and wherein the leaf spring member is positioned within the first recess when the tray is in one of the at least two indexed positions and is positioned within the second recess when the tray is in the other of the at least two indexed positions.

4. The telecommunications tray assembly of claim 1, wherein the leaf spring member is integrally formed with the at least one hinged tray.

5. The telecommunications tray assembly of claim 1, wherein the at least one hinged tray is a unitarily formed component.

6. The telecommunications tray assembly of claim 1, wherein the pair of support arms are deflectable support arms.

7. The telecommunications tray assembly of claim 1, wherein the at least one hinged tray includes a pair of hinge arms engaged with the tower structure.

8. A telecommunications tray comprising:
a) a main body including an end wall and a perimeter sidewall defining an interior region for the storage of telecommunications components;
b) a first hinge arm and a second hinge arm extending away from the main body, the first and second hinge arms each including a projection for rotatably mounting the tray to a tower structure about a pivot axis; and
c) a position retention structure including a leaf spring member extending in a direction parallel to the pivot axis, the leaf spring member being located between and spaced from the first and second hinge arms, the leaf spring member being deflectable in a direction that is orthogonal to the pivot axis.

9. The telecommunications tray of claim 8, wherein the position retention structure includes a first support arm and a second support arm, the leaf spring member extending between the first and second support arms.

10. The telecommunications tray of claim 9, wherein the first and second support arms are deflectable.

11. The telecommunications tray of claim 8, wherein the telecommunications tray is unitarily formed as a single component.

12. The telecommunications tray of claim 8, wherein the projections of the first and second hinge arms extend inwardly towards each other.

13. A telecommunications tray assembly comprising:
a) a tower structure; and
b) a plurality of the telecommunications trays of claim 8 rotatably mounted to the tower structure, the trays being rotatable between at least two indexed positions, wherein the trays are positively retained in the at least two indexed positions by a position retention structure.

14. The telecommunications tray assembly of claim 13, wherein all of the plurality of trays can be rotated simultaneously between the at least two indexed positions.

15. The telecommunications tray assembly of claim 13, wherein the position retention structure of each of the plurality of telecommunications trays holds the entire weight of the tray when the tray is in at least one of the two indexed positions.

16. A telecommunications tray comprising:
a) a main body defining a telecommunications component storage area;
b) a connection structure including a pair of hinge arms configured for rotatably connecting the main body to a base structure such that the main body is rotatable about a pivot axis; and
c) a position retention structure, located between the pair of hinge arms, including a spring member; the spring member extending in a direction parallel to the pair of hinge arms and being spaced from the hinge arms, the spring member being deflectable about an axis that is parallel to the pivot axis.

17. The telecommunications tray of claim 16, wherein the connection structure and the position retention structure are integrally formed with the main body.

18. The telecommunications tray of claim 16, wherein the spring member includes a pair of spring members.

19. The telecommunications tray of claim 16, wherein the telecommunications tray is unitarily formed as a single component.

* * * * *